US011638269B2

(12) United States Patent
Manolakos et al.

(10) Patent No.: US 11,638,269 B2
(45) Date of Patent: Apr. 25, 2023

(54) CHANNEL STATE INFORMATION REPORT AGGREGATION AND UPLINK CONTROL INFORMATION MULTIPLEXING FOR SIDELINK COMMUNICATIONS

(71) Applicant: QUALCOMM Incorporated, San Diego, CA (US)

(72) Inventors: Alexandros Manolakos, San Diego, CA (US); Seyedkianoush Hosseini, San Diego, CA (US); Gokul Sridharan, Sunnyvale, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 227 days.

(21) Appl. No.: 16/917,799

(22) Filed: Jun. 30, 2020

(65) Prior Publication Data

US 2021/0051681 A1 Feb. 18, 2021

(30) Foreign Application Priority Data

Aug. 13, 2019 (GR) .............................. 20190100352

(51) Int. Cl.
*H04W 24/10* (2009.01)
*H04W 72/10* (2009.01)
(Continued)

(52) U.S. Cl.
CPC .......... *H04W 72/10* (2013.01); *H04B 7/0626* (2013.01); *H04W 24/10* (2013.01); *H04W 72/0413* (2013.01)

(58) Field of Classification Search
None
See application file for complete search history.

(56) References Cited

U.S. PATENT DOCUMENTS

2012/0140708 A1 6/2012 Choudhury et al.
2013/0121270 A1 5/2013 Chen et al.
(Continued)

OTHER PUBLICATIONS

Huawei, et al., "Sidelink CSI", 3GPP Draft, 3GPP TSG RAN WG1 Meeting #96bis, R1-1904688, vol. RAN WG1, No. Xi'an, China, Apr. 8, 2019-Apr. 12, 2019, Apr. 2, 2019 (Apr. 2, 2019), XP051707281, 6 Pages, Retrieved from the Internet: URL: http://www.3gpp.org/ftp/tsg%5Fran/WG1%5FRL1/TSGR1%5F96b/Docs/R1%2D1904688%2Ezip, [retrieved on Apr. 2, 2019], Sections 1-4.
(Continued)

*Primary Examiner* — Scott M Sciacca
(74) *Attorney, Agent, or Firm* — Holland & Hart LLP

(57) ABSTRACT

Methods, systems, and devices for wireless communication are described. Generally, the described techniques provide for prioritizing, at a user equipment (UE), sidelink CSI reports received from other UEs. In one example, the UE may be configured to transmit sidelink CSI reports (e.g., received from other UEs) separately from other CSI reports (e.g., CSI reports generated by the UE), and the UE may prioritize sidelink CSI reports for transmission based on the priorities of the UEs from which the CSI reports are received. The UE may then aggregate and transmit the prioritized sidelink CSI reports to a network entity. In another example, the UE may be configured to transmit sidelink CSI reports with other CSI reports in a same channel, and the UE may prioritize the sidelink CSI reports over the other CSI reports for transmission to a network entity.

28 Claims, 20 Drawing Sheets

(51) Int. Cl.
*H04W 72/04* (2009.01)
*H04B 7/06* (2006.01)

(56) References Cited

U.S. PATENT DOCUMENTS

| | | | |
|---|---|---|---|
| 2019/0081679 A1* | 3/2019 | Davydov | H04L 5/0057 |
| 2019/0149285 A1* | 5/2019 | Tsai | H04L 5/0044 |
| | | | 370/329 |
| 2021/0045093 A1* | 2/2021 | Rao | H04W 36/0009 |
| 2021/0226683 A1* | 7/2021 | Yoshioka | H04L 1/0026 |
| 2021/0385842 A1* | 12/2021 | Zhao | H04L 5/0057 |

OTHER PUBLICATIONS

International Search Report and Written Opinion—PCT/US2020/040456—ISAEPO—dated Oct. 6, 2020.

* cited by examiner 600-a 600-b

CHANNEL STATE INFORMATION REPORT AGGREGATION AND UPLINK CONTROL INFORMATION MULTIPLEXING FOR SIDELINK COMMUNICATIONS

CROSS REFERENCE

The present application for patent claims the benefit of Greece Provisional Patent Application No. 20190100352 by MANOLAKOS et al., entitled "CHANNEL STATE INFORMATION REPORT AGGREGATION AND UPLINK CONTROL INFORMATION MULTIPLEXING FOR SIDELINK COMMUNICATIONS," filed Aug. 13, 2019, assigned to the assignee hereof, and expressly incorporated by reference herein.

BACKGROUND

The following relates generally to wireless communications and more specifically to channel state information (CSI) report aggregation and uplink control information (UCI) multiplexing for sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support sidelink communications between UEs (e.g., in addition to uplink or downlink communications between UEs and base stations).

SUMMARY

The described techniques relate to improved methods, systems, devices, and apparatuses that support channel state information (CSI) report aggregation and uplink control information (UCI) multiplexing for sidelink communications. Generally, the described techniques provide for prioritizing, at a user equipment (UE), sidelink CSI reports received from other UEs. In one example, the UE may be configured to transmit sidelink CSI reports (e.g., received from other UEs) separately from other CSI reports (e.g., CSI reports generated by the UE), and the UE may prioritize sidelink CSI reports for transmission based on the priorities of the UEs from which the CSI reports are received. The UE may then aggregate and transmit the prioritized sidelink CSI reports to a network entity. In another example, the UE may be configured to transmit sidelink CSI reports with other CSI reports in a same channel, and the UE may prioritize the sidelink CSI reports (or parts of the sidelink CSI reports) over the other CSI reports for transmission to a network entity.

DETAILED DESCRIPTION

Figure 1:
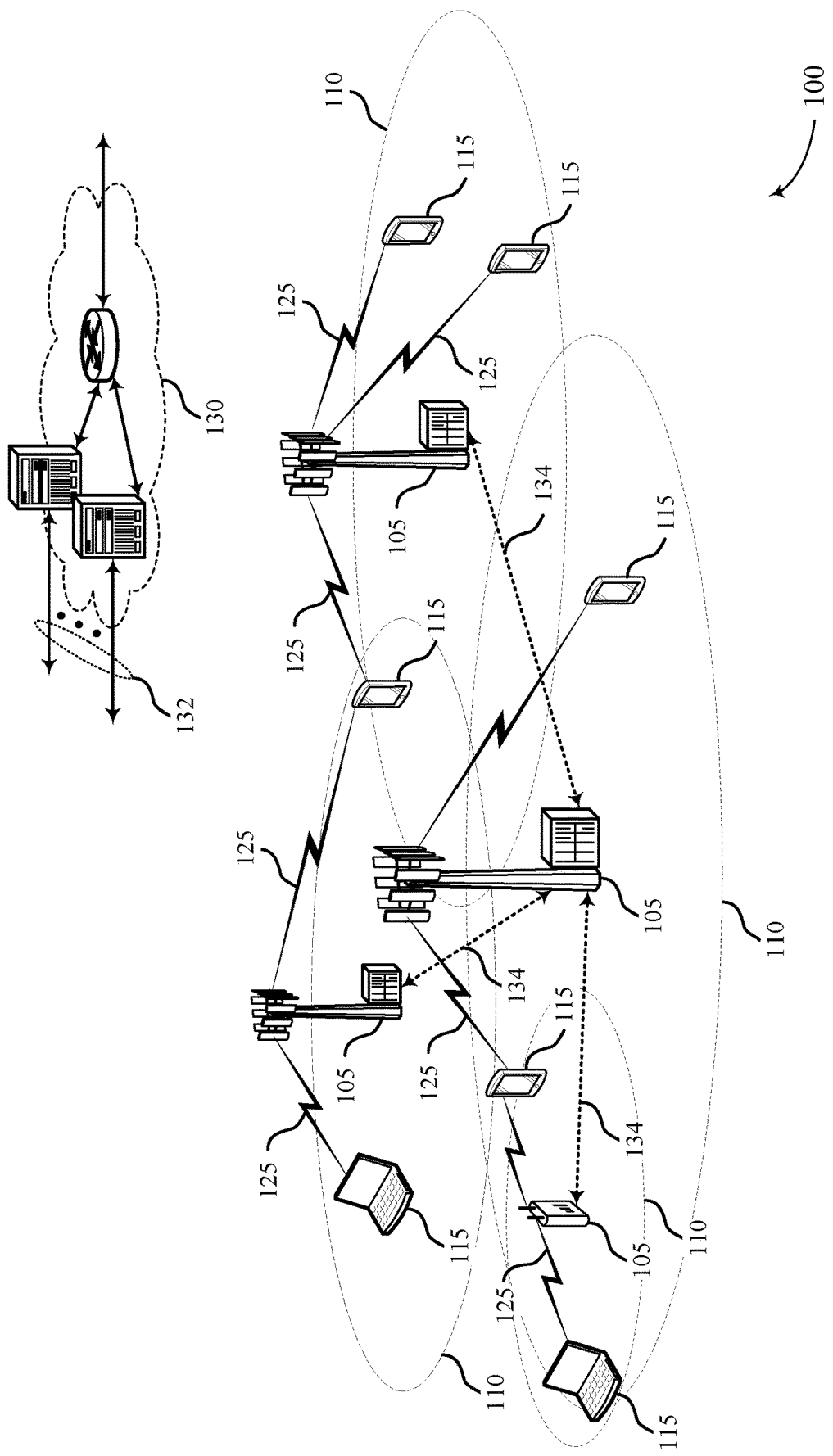
FIG. 1 illustrates an example of a wireless communications system that supports channel state information (CSI) report aggregation and uplink control information (UCI) multiplexing for sidelink communications in accordance with aspects of the present disclosure.

In some wireless communications systems, a user equipment (UE) may perform channel measurements based on downlink signals received from a base station, and the UE may transmit channel state information (CSI) feedback to the base station including the results of the channel measurements. Using the CSI feedback, the base station may be able to efficiently schedule and configure transmissions to the UE and transmissions from the UE. In some examples, the UE may be scheduled to transmit multiple CSI reports to a base station simultaneously. In such examples, the UE may prioritize the CSI reports based on various factors and the UE may omit one or more of the lower priority CSI reports or parts of the lower priority CSI reports if the payload size of the CSI report transmission exceeds a maximum payload size. Using these techniques, the UE may be able to efficiently provide CSI feedback to a base station.

In some systems (e.g., systems supporting sidelink communications), in addition to the CSI reports pertaining to the channel conditions between the UE and the base station, the UE may forward sidelink CSI reports received from other UEs to the base station. In particular, the UE may be in sidelink communications with multiple other UEs, and the UE may serve as a relay between the other UEs and the base station. As such, the UE may aggregate and forward sidelink CSI reports received from the other UEs to the base station. In such systems, however, the techniques described above for prioritizing CSI reports generated by a UE may not be appropriate for prioritizing sidelink CSI reports received from other UEs (e.g., since these techniques fail to consider the priorities of sidelink CSI reports). Thus, if these techniques are applied for prioritizing sidelink CSI reports, the sidelink CSI feedback may be compromised resulting in reduced throughput in a wireless communications system.

As described herein, a UE may support efficient techniques for prioritizing sidelink CSI reports received from other UEs for forwarding to a base station. In one example, the UE may be configured to transmit sidelink CSI reports (e.g., received from other UEs) separately from other CSI reports (e.g., CSI reports generated by the UE), and the UE may prioritize sidelink CSI reports for transmission based on the priorities of the UEs from which the sidelink CSI reports are received. The UE may then aggregate and transmit the prioritized sidelink CSI reports to the base station. In another example, the UE may be configured to transmit sidelink CSI reports with other CSI reports in a same channel, and the UE may prioritize the sidelink CSI reports (or parts of the sidelink CSI reports) over the other CSI reports for transmission to the base station.

Using the techniques described above, when a transmission of sidelink CSI reports collides with a transmission of other CSI reports, a UE may be capable of prioritizing the sidelink CSI reports and the other CSI reports for transmission. That is, the UE may be capable of handling CSI report collisions. Further, because the UE may prioritize the CSI reports, the UE may transmit the appropriate CSI reports when there are not enough resources available for transmitting all the CSI reports. In one example, the UE may transmit sidelink CSI reports and omit other CSI reports to improve the reliability of sidelink communications between UEs. In another example, the UE may transmit CSI reports for high-reliability communications and omit other CSI reports to satisfy the reliability requirements of the high-reliability communications. In yet another example, the UE may transmit CSI reports for unicast transmissions and omit other CSI reports to improve the reliability of unicast transmissions (e.g., since unicast transmissions may be used for higher priority communications than groupcast or broadcast transmissions).

Aspects of the disclosure introduced above are described below in the context of a wireless communications system. Examples of processes and signaling exchanges that support CSI report aggregation and UCI multiplexing for sidelink communications are then described. Aspects of the disclosure are further illustrated by and described with reference to apparatus diagrams, system diagrams, and flowcharts that relate to CSI report aggregation and UCI multiplexing for sidelink communications.

FIG. 1 illustrates an example of a wireless communications system 100 that supports CSI report aggregation and UCI multiplexing for sidelink communications in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 over a sidelink connection (e.g., using a peer-to-peer (P2P) or device-to-device (D2D) protocol). Such communications may be referred to as sidelink communications or D2D communications. One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105. Examples of D2D communications may include vehicle to vehicle (V2V) communications, vehicle to everything (V2X) communications, etc.

In one example, sidelink communications between UEs 115 may include discovery expression transmissions on a physical sidelink discovery channel (PSDCH) (e.g., to allow proximal devices to discover each other's presence). In another example, sidelink communications may include control information transmissions on a physical sidelink control channel (PSCCH) (e.g., carrying resources and other parameters used for data, where the starting symbol and the number of symbols for a PSCCH may be known to the receiving UE 115 before decoding the PSCCH). In yet another example, sidelink communications may include data transmissions on a physical sidelink shared channel (PSSCH) (e.g., in a slot on a carrier, where all the symbols in a slot are available for sidelink or a subset of consecutive symbols in a slot is available for sidelink). In yet another example, sidelink communications may include feedback transmissions on a physical sidelink feedback channel (PSFCH) (e.g., where the PSFCH may have a sequence-based PSFCH format with one symbol (not including an automatic gain control (AGC) training period), a PSFCH format based on PUCCH format 2, or a PSFCH format spanning all available symbols for sidelink in a slot).

In some cases, the configuration signaling for sidelink bandwidth parts (BWPs) may be separate from the configuration signaling for uplink BWPs. In such cases, a UE 115 may not be expected to use different numerologies in a configured sidelink BWP and an active uplink BWP in the same carrier at a given time. Further, the time scale of the sidelink numerology, the relation between a sidelink BWP and a downlink BWP (e.g., including an initial uplink BWP), and the relation between the sidelink BWP frequency location and bandwidth to that of the uplink BWP may be signaled or preconfigured. In some cases, the BWP may be defined for sidelink (e.g., in NR). In a licensed carrier, the sidelink BWP may be defined separately from the uplink BWP or defined relative to the uplink BWP. Further, the same BWP may be used for both transmission and reception. In some examples, for time domain resources, a resource pool for a PSSCH may include non-contiguous time resources (e.g., with varying granularity). In addition, for frequency domain resources, a resource pool for a PSSCH may consist of contiguous physical resource blocks (PRBs), non-contiguous PRBs, or both. Sidelink communications may support cyclic prefix orthogonal frequency division multiplexing (CP-OFDM).

In some aspects, CSI reporting for sidelink may be enabled or disabled by configuration (e.g., configure a subset of the above metrics for CSI reporting). A CSI report (e.g., carrying CSI or CSI feedback) may include a channel quality indicator (CQI) indicating a quality of a channel, a precoding matrix indicator (PMI) indicating a precoder for a transmitting device to use for transmissions, and a rank indicator (RI) indicating a transmission mode for a transmitting device to use for transmissions. There may be no standalone reference signal transmissions dedicated to CSI reporting, and sidelink CSI may reuse the CSI framework for uplink communications (e.g., in NR). In some cases, sidelink CSI reference signals (SL-CSI-RSs) may be supported for CQI or RI measurements for no more than two ports (e.g., where SL-CSI-RS is confined within the PSSCH transmission). In mode one for unicast and groupcast sidelink transmissions, the transmitter UE 115 may report an indication to a base station 105 to request a retransmission of a transport block transmitted by the transmitter UE 115 (e.g., where the format of the indication may be in the form of a hybrid automatic repeat request (HARQ) acknowledgment (ACK) or negative-acknowledgment (NACK), or in the form of a scheduling request (SR) or a buffer status report (BSR), etc.). In some examples, the receiver UE 115 may report such an indication to request retransmission of a transport block (e.g., with no inter-base station communication). Further, a sidelink HARQ ACK or NACK report may not be supported from a UE 115 to a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users. Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In wireless communications system 100, a UE 115 may perform channel measurements based on signals received from a base station 105, and the UE 115 may transmit CSI feedback to the base station 105 including the results of the channel measurements. Using the CSI feedback, the base station 105 may be able to efficiently schedule and configure transmissions to the UE 115. In some examples, the UE 115 may be scheduled to transmit multiple CSI reports to the base station 105 simultaneously. In such examples, two or more CSI report transmissions may collide (e.g., a periodic and an aperiodic CSI report transmission). Additionally, or alternatively, CSI reports scheduled to be transmitted simultaneously may collectively have too large of a payload size (e.g., large number of bits) and may not fit in a UCI container (e.g., when HARQ-ACK and/or SR is multiplexed for transmission). To limit the payload size of CSI reports, the UE 115 may prioritize the CSI reports based on various factors, and the UE 115 may omit one or more of the lower priority CSI reports or parts of the lower priority CSI reports if the payload size of a CSI report transmission exceeds a maximum payload size.

As an example, CSI reports may first be prioritized according to their time-domain behavior (or configuration) and the physical channel on which the CSI reports are scheduled to be transmitted, where more dynamic CSI reports are given precedence over less dynamic CSI reports, and a PUSCH CSI report has precedence over a PUCCH CSI report. For instance, an aperiodic CSI report has priority over a semi-persistent report on a PUSCH, which in turn has priority over a semi-persistent CSI report on PUCCH, which has priority over a periodic CSI report. Further, if multiple CSI reports with the same time-domain behavior and physical channel collide, the CSI reports may be further prioritized depending on the CSI content, where beam reports (e.g., layer1 (L1) reference signal received power (L1-RSRP) reporting) have priority over regular CSI reports (e.g., CSI reports without beam information).

The prioritization of CSI reports based on whether the CSI reports include beam reports may be appropriate since the CSI report is typically conditioned on a serving beam, so, if the beam is not correct, the CSI report may be useless. If further prioritization is appropriate, the CSI reports may be further prioritized based on the serving cell to which the CSI report corresponds (e.g., in the case of carrier aggregation operation). That is, CSI reports corresponding to a primary cell (PCell) may have priority over CSI reports corresponding to secondary cells (SCells). In addition, to avoid or prevent ambiguities associated with determining which CSI report to transmit, CSI reports may be prioritized based on a report configuration identification (ID) assigned to the CSI reports.

Figure 2:
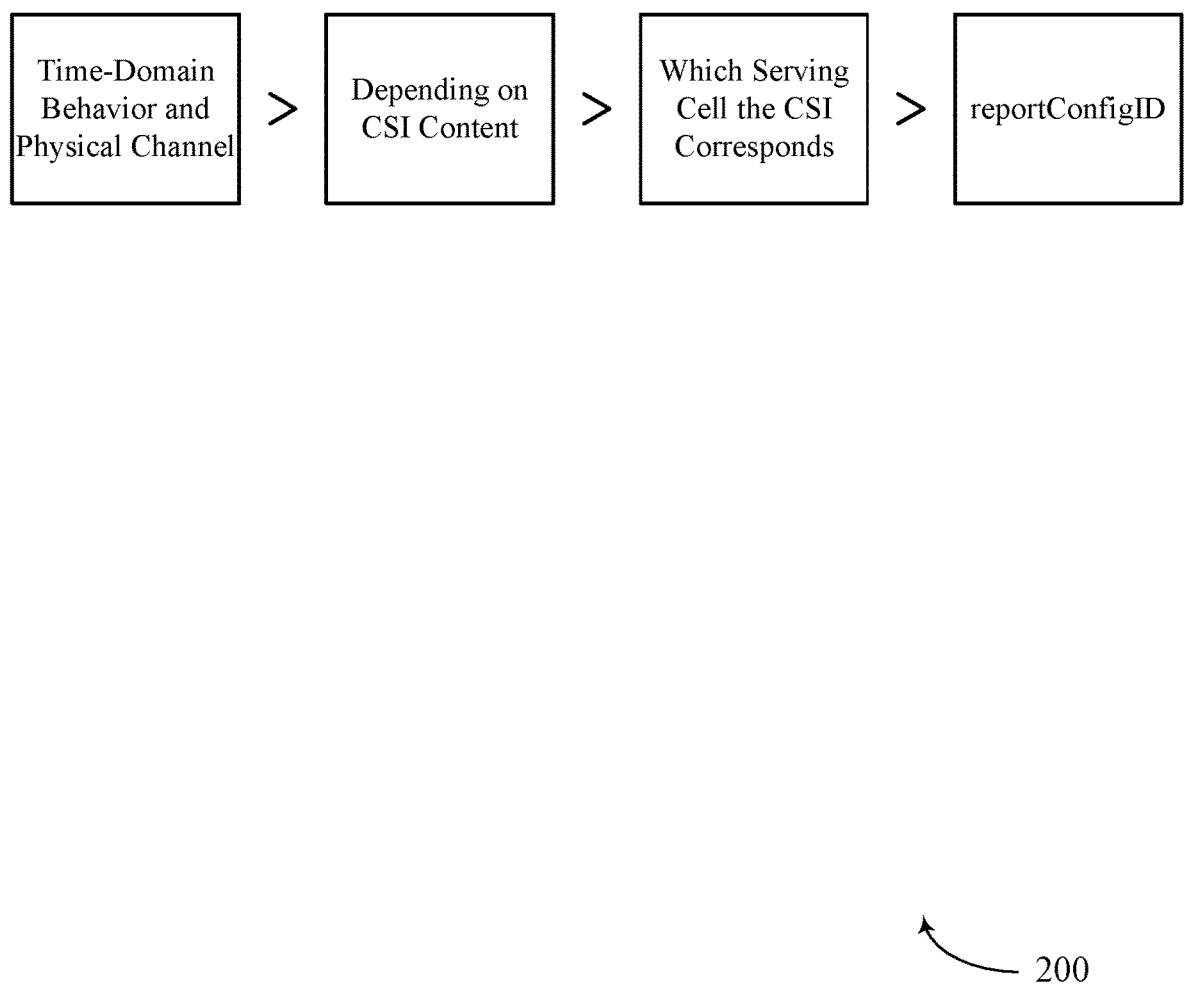
FIG. 2 illustrates an example of the prioritization of CSI reports based on time-domain and physical channel configurations, CSI content, serving cell, and report configuration ID in accordance with aspects of the present disclosure.

FIG. 2 illustrates an example of the prioritization 200 of CSI reports based on time-domain and physical channel configurations, CSI content, serving cell, and report configuration ID in accordance with aspects of the present disclosure. In the example of FIG. 2, time-domain and physical channel configurations may be more impactful on the priority of a CSI report than CSI content, CSI content may be more impactful on the priority of a CSI report than the serving cell to which the CSI report pertains, and the serving cell to which the CSI report pertains may be more impactful on the priority of a CSI report than the report configuration ID. The impact of each of these factors on the priority of a CSI report may be represented in an equation used to assign a priority value to each CSI report. That is, the CSI reports may be prioritized by applying a priority value to each CSI report, where a first CSI report is said to have priority over a second CSI report if the priority value is lower for the first CSI report than for the second CSI report.

The following is an example equation used to assign a priority value to each CSI report generated for transmission to a base station 105:

$$\text{Pri}_{iCSI}(y,k,c,s) = 2 \cdot N_{cells} \cdot M_s \cdot y + N_{cells} \cdot M_s \cdot k + M_s \cdot c + s \quad (1)$$

where y=0 for aperiodic CSI reports to be carried on PUSCH, y=1 for semi-persistent CSI reports to be carried on PUSCH, y=2 for semi-persistent CSI reports to be carried on PUCCH, and y=3 for periodic CSI reports to be carried on PUCCH. In addition, k=0 for CSI reports carrying L1-RSRP, k=1 for CSI reports not carrying L1-RSRP, c is the serving cell index, $N_{cells}$ is the value of the higher layer parameter maxNrofServingCells, s is the reportConfigID, and $M_S$ is the value of the higher layer parameter maxNrofCSI-Report-Configurations.

Since the mathematical weight ($2 \cdot N_{cells} \cdot M_s$) applied to the value (y) assigned based on the time-domain behavior and physical channel may be greater than the mathematical weight ($N_{cells} \cdot M_s$) applied to the value (k) assigned based on the CSI content, the time-domain behavior and physical channel may be more impactful on the priority of a CSI report. Similarly, since the mathematical weight ($N_{cells} \cdot M_s$) applied to the value (k) assigned based on the CSI content may be greater than the mathematical weight ($M_s$) applied to the value (c) assigned based on the serving cell, the CSI content may be more impactful on the priority of a CSI report than the serving cell to which the CSI report pertains. Finally, since the mathematical weight ($M_s$) applied to the value (c) assigned based on the serving cell may be greater than the mathematical weight (1) applied to the value (s) assigned based on the report configuration ID, the serving cell to which a CSI report pertains may be more impactful on the priority of the CSI report than the report configuration ID.

Using the above techniques for prioritization, a single CSI report may be transmitted in the case of CSI collision. Alternatively, in some aspects, if multiple PUCCH-based CSI reports collide, a UE 115 may be configured with a larger multi-CSI PUCCH resource, where several CSI reports may be multiplexed in the case of collision. In such aspects, the UE 115 may transmit any number of CSI reports in the multi-CSI PUCCH resource as long as the UE 115 does not exceed a maximum UCI code rate. If the maximum UCI code rate is exceeded, the UE 115 may be configured to omit a part of a CSI report.

As an example, for PUSCH-based CSI reporting and type two CSI reporting, the CSI payload size can vary quite dramatically depending on the RI selection. In particular, the PMI payload size for an RI of two may be close to double the PMI payload size for an RI of one. Thus, since the RI selection may not be known at a base station 105 prior to scheduling an aperiodic CSI report on the PUSCH, the base station 105 may allocate PUSCH resources (e.g., in a frequency and time domain) by using a best guess of the RI selection that a UE 115 would make (e.g., based on previous RI reports). In this example, however, the base station 105 may allocate PUSCH resources based on an assumption that a UE 115 would report an RI of one, and the UE 115 may instead report an RI of two. As a result, the CSI payload may not fit in the PUSCH container (i.e., the code rate may be too large or even the un-coded systematic bits may not fit in the PUSCH container). In such cases, instead of dropping the entire CSI report (e.g., which would be wasteful), a wireless communications system may support partial CSI omission, where a UE may still report a portion of CSI. Accordingly, the reported CSI may at least provide some utility to a base station 105 and provide information about the RI selection so that the base station 105 may allocate a proper PUSCH resource for a next aperiodic CSI transmission.

In order to support partial CSI omission, a UE 115 may order or arrange the CSI content (e.g., in part two of a PUSCH CSI report) such that higher priority CSI feedback is included in a PUSCH container before lower priority CSI feedback. In particular, if multiple CSI reports are transmitted in the PUSCH, the wideband CSI components (e.g., the wideband PMI and CQI) for all the reports are mapped to the most significant bits of the UCI. Then, the subband CSI reports are prioritized and mapped according to priority, where the subband CSI for even numbered subbands are mapped first, followed by subband CSI for odd numbered subbands.

Figure 3:
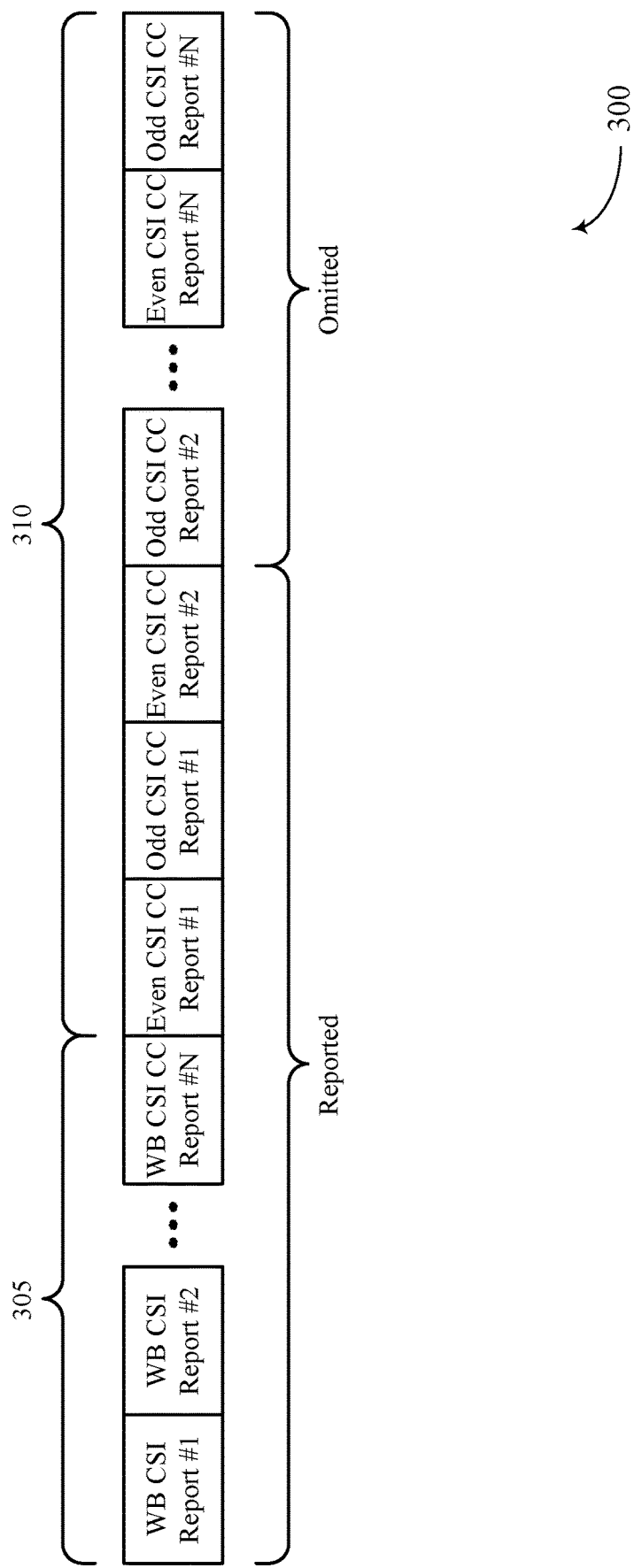
FIG. 3 illustrates an example of the mapping of CSI reports to UCI in accordance with aspects of the present disclosure.

FIG. 3 illustrates an example of the mapping 300 of CSI reports to UCI in accordance with aspects of the present disclosure. In the example of FIG. 3, the wideband CSI reports 305 are mapped to the most significant bits of the UCI, and the subband CSI reports 310 are prioritized and mapped to the remaining bits of the UCI, with higher priority CSI reports being mapped first. Thus, if the resulting code rate of the UCI is above a threshold, a portion of the least significant UCI bits may be omitted until the code rate falls below the threshold (e.g., where subband CSI for odd-numbered subbands for a report may be omitted first). As a result, a base station 105 would have subband PMI and CQI for every other subband in the frequency domain (e.g., since CSI may not be omitted for consecutive subbands) and may be able to interpolate the PMI or CQI reported for two subbands to try to estimate the missing PMI or CQI values for the subband in the middle of the two subbands.

Figure 4:
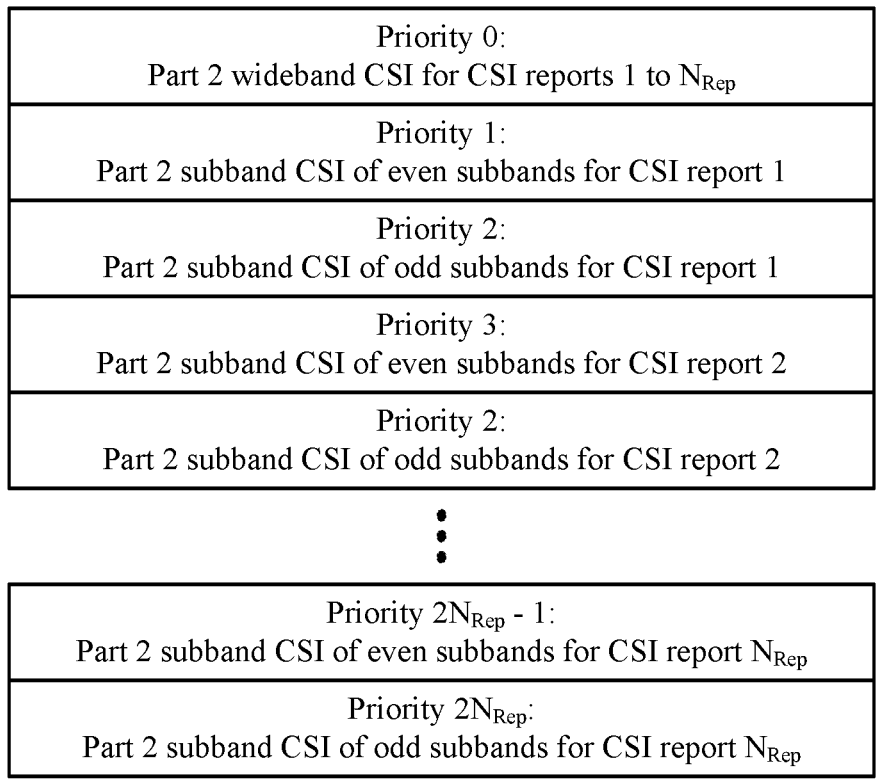
FIG. 4 illustrates an example of a table illustrating the priority levels for part two CSI in accordance with aspects of the present disclosure.

FIG. 4 illustrates an example of a table 400 illustrating the priority reporting levels for part 2 CSI in accordance with aspects of the present disclosure. In the example of FIG. 4, $N_{rep}$ may be the number of CSI reports configured to be carried on the PUSCH. Priority 0 may be the highest priority, priority $2N_{rep}$ may be the lowest priority, and the CSI report n may correspond to the CSI report with the nth smallest $Pri_{i,CSI}(y, k, c, s)$ value among the $N_{rep}$ CSI reports. In addition, the subbands for a given CSI report n indicated by the higher layer parameter csi-ReportingBand may be numbered continuously in increasing order with the lowest subband of csi-ReportingBand as subband 0. Thus, when CSI reporting on a PUSCH includes two parts, and the payload size of CSI reports exceeds a maximum size of a UCI container, a UE 115 may omit a portion of the part 2 CSI. Further, when a UE 115 determines to omit CSI information for a particular priority level, the UE 115 may omit all of the information at that priority level.

Using the techniques described above with reference to FIGS. 2-4, a UE 115 may be able to efficiently determine which CSI reports to omit from a transmission to a base station 105 if the payload size of the CSI reports to be transmitted exceeds the maximum size of a UCI container. In some systems, however, in addition to transmitting the CSI reports pertaining to the channel conditions between the UE 115 and the base station 105 to the base station 105, the UE 115 may forward sidelink CSI reports received from other UEs 115 to the base station 105. In particular, the UE 115 may be in sidelink communications with multiple other UEs 115, and the UE 115 may aggregate and forward sidelink CSI reports received from the other UEs 115 to the base station 105. In such systems, the techniques described above for prioritizing CSI reports generated by a UE 115 may not be appropriate for prioritizing sidelink CSI reports (e.g., since these techniques fail to consider the priorities of sidelink CSI reports). Thus, if these techniques are applied for prioritizing sidelink CSI reports, the sidelink CSI feedback may be compromised resulting in reduced throughput in a wireless communications system. As described herein, a UE 115 in wireless communications system 100 may support efficient techniques for prioritizing sidelink CSI reports received from other UEs 115 for forwarding to a base station 105.

Figure 5:
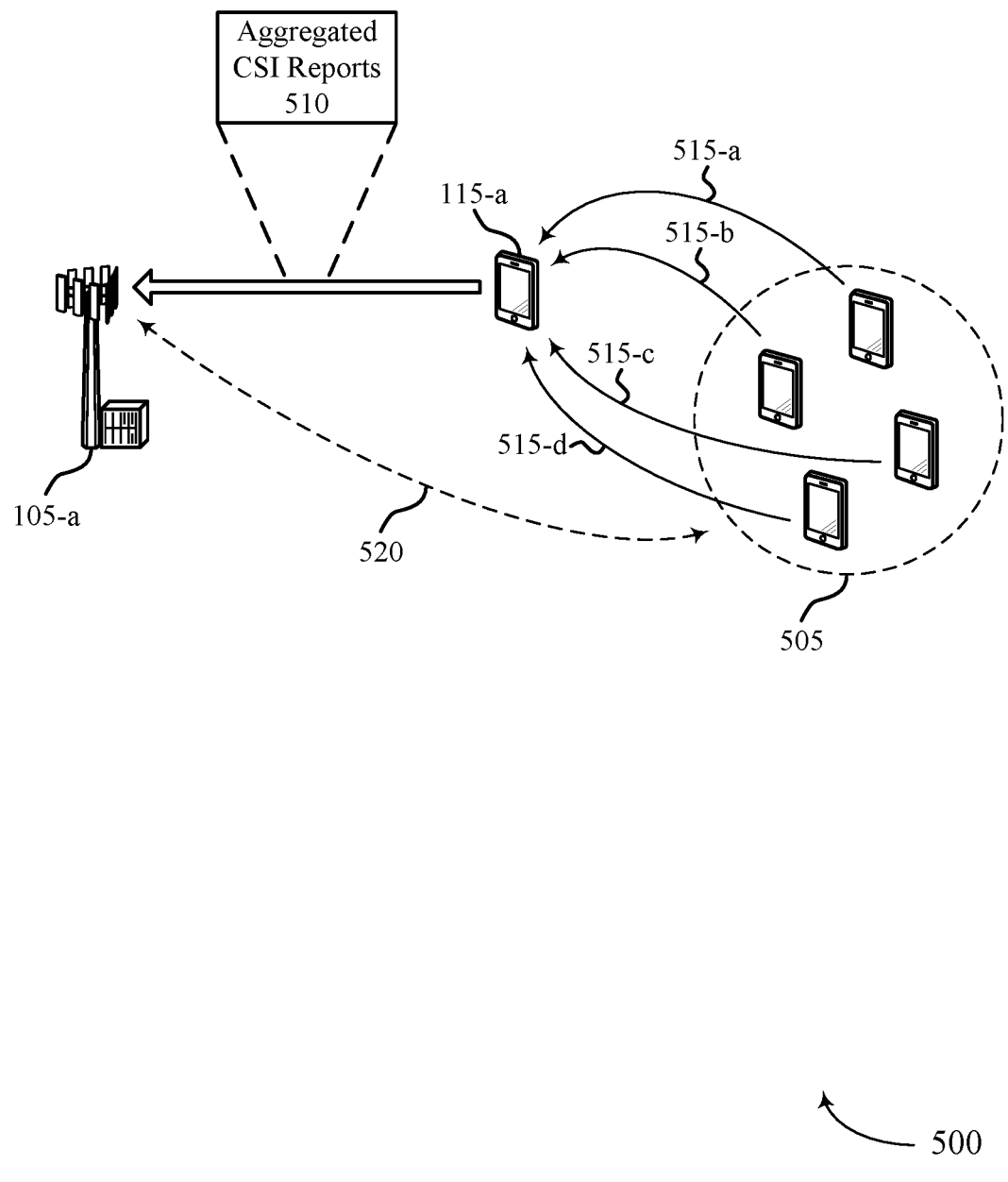
FIG. 5 illustrates an example of a wireless communications system that supports CSI report aggregation and UCI multiplexing for sidelink communications in accordance with aspects of the present disclosure.

FIG. 5 illustrates an example of a wireless communications system 500 that supports CSI report aggregation and UCI multiplexing for sidelink communications in accordance with aspects of the present disclosure. Wireless communications system 500 includes base station 105-*a*, which may be an example of a base station 105 described with reference to FIGS. 1-4. Wireless communications system 500 also includes a first UE 115-*a* and a group of second UEs 505, which may be examples of a UE 115 described with reference to FIGS. 1-4. The base station 105-*a* may be an example of a network entity with which the first UE 115-*a* may communicate. Other examples of the network entity may include a cell, a server, a roadside unit (RSU), etc. Wireless communications system 500 may implement aspects of wireless communications system 100. For example, first UE 115-*a* may support efficient techniques for prioritizing sidelink CSI reports received from the group of second UEs 505 (or a subset of the group of second UEs 505) for forwarding to base station 105-*a*. In the examples described below, a sidelink CSI report may correspond to a report pertaining to channel conditions between UEs, and each sidelink CSI report may be transmitted by a UE 115 in the group of second UEs 505 to first UE 115-*a* in a PSFCH, PSSCH, or a PSCCH.

In the example of FIG. 5, the first UE 115-*a* may serve as a relay for communications between the group of second UEs 505 and the base station 105-*a* (e.g., over sidelink connections 515-*a*, 515-*b*, 515-*c*, and 515-*d*). For instance, if the group of second UEs 505 are outside of a coverage area supported by base station 105-*a*, or if the group of second UEs 505 are closer to first UE 115-*a* than to base station 105-*a*, the group of second UEs 505 may transmit data or control information to first UE 115-*a* to be forwarded to base station 105-*a* (e.g., rather than transmitting the data or control information directly to base station 105-*a* on a direct link 520). As an example, first UE 115-*a* may receive UCI from the group of second UEs 505, and the first UE 115-*a* may forward the UCI to the base station 105-*a* for processing (e.g., where the base station 105-*a* may use UCI received from a UE 115 in the group of second UEs 505 to configure sidelink communications between the UE 115 and other UEs 115). In some aspects, conventional techniques at first UE 115-*a* for multiplexing and forwarding UCI received from other UEs 115 to a base station 105 may be improved.

In one implementation, the first UE 115-*a* may be configured to transmit sidelink CSI reports (e.g., received from the group of second UEs 505) separately from other CSI reports (e.g., CSI reports generated by the first UE 115-*a* based on channel conditions between the first UE 115-*a* and the base station 105-*a*). In this implementation, the first UE 115-*a* may aggregate the sidelink CSI reports and transmit the aggregated CSI reports 510 to the base station 105-*a*. The first UE 115-*a* may prioritize sidelink CSI reports for transmission based on the priorities of the second UEs 115 from which the CSI reports are received. In particular, the first UE 115-*a* may receive an indication of (or otherwise determine) a priority associated with each second UE 115 in the group of second UEs 505 from which a sidelink CSI report is received, and the first UE 115-*a* may prioritize a sidelink CSI report received from the second UE 115 based on the priority of the second UE 115.

In some cases, the priority of the second UE 115 may be a priority assigned to an identification (ID) of the second UE 115, a priority assigned to an ID of a set of UEs 115 that includes the second UE 115, or a priority assigned to an ID of sidelink communications (e.g., a communications session) between the second UE 115 and the first UE 115-*a*. In such cases, CSI reports received from each second UE 115, or each set of UEs 115, or each sidelink communications session may be considered one report for prioritization (e.g., may be assigned a single report configuration ID), and this one report or parts of this one report (e.g., potentially including multiple CSI reports) may be omitted if the priority of the one report is low and the payload size of the CSI reports to be forwarded to base station 105-*a* (e.g., those CSI reports prioritized over the one report) is too large (e.g., larger than a maximum payload size of a UCI container).

Figure 6:
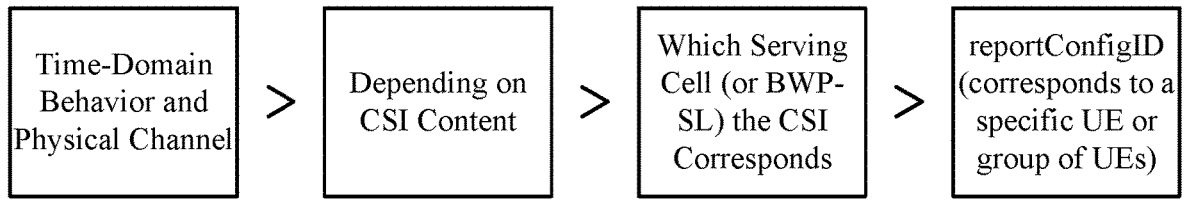
FIG. 6 illustrates an example of the prioritization of a sidelink CSI report based on the priority of the second UE from which the sidelink CSI report is received in accordance with aspects of the present disclosure.
Figure 6:
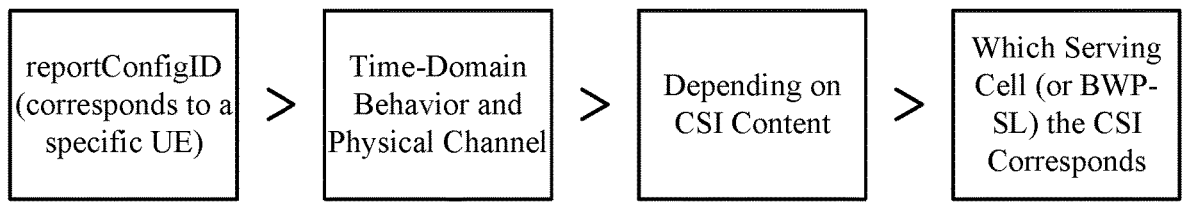

FIG. 6 illustrates examples of prioritizations 600 of sidelink CSI reports based on the priorities of the second UEs 115 from which the sidelink CSI reports are received in accordance with aspects of the present disclosure. In both examples 600-*a* and 600-*b*, a sidelink CSI report is prioritized based on a report configuration ID which may correspond to the priority of the second UE 115 from which the sidelink CSI report is received. The sidelink CSI report is also prioritized based on other factors, such as the time-domain and physical channel configurations, CSI content, and the serving cell or sidelink BWP part to which the sidelink CSI report pertains (e.g., the serving cell or sidelink BWP whose channel conditions are measured and included in the CSI report).

In example 600-*a*, time-domain and physical channel configurations may be more impactful on the priority of a CSI report than CSI content, CSI content may be more impactful on the priority of the CSI report than the serving cell or sidelink BWP to which the CSI report pertains, and the serving cell of sidelink BWP to which the CSI report pertains may be more impactful on the priority of a CSI report than the report configuration ID which is assigned based on the priority of the second UE from which the CSI report is received. Thus, if an equation is used to determine the priority value to assign to a CSI report, the mathematical weight applied to a value in the equation assigned based on the time-domain and physical channel configurations may be greater than the mathematical weight applied to a value in the equation assigned based on the CSI content. Further, the mathematical weight applied to the value in the equation assigned based on the CSI content may be greater than the mathematical weight applied to a value in the equation assigned based on the serving cell or sidelink BWP to which the CSI report pertains. In addition, the mathematical weight applied to the value in the equation assigned based on the serving cell or sidelink BWP to which the CSI report pertains may be greater than the mathematical weight applied to a value in the equation assigned based on the report configuration ID (e.g., where the report configuration ID is assigned based on the priority of the second UE 115 from which the CSI report is received).

In example 600-*b*, the report configuration ID which is assigned based on the priority of the second UE 115 from which a CSI report is received may be more impactful on the priority of the CSI report than time-domain and physical channel configurations, time-domain and physical channel configurations may be more impactful on the priority of the CSI report than CSI content, and CSI content may be more impactful on the priority of the CSI report than the serving cell or sidelink BWP to which the CSI report pertains. Thus, if an equation is used to determine the priority value to assign to a CSI report, the mathematical weight applied to a value in the equation assigned based on the report configuration ID (or the priority of the second UE 115 from which the CSI report is received) may be greater than the mathematical weight applied to a value in the equation assigned based on the time-domain and physical channel configurations. Further, the mathematical weight applied to the value in the equation assigned based on the time-domain and physical channel configurations may be greater than the mathematical weight applied to a value in the equation assigned based on the CSI content. In addition, the mathematical weight applied to the value in the equation assigned based on the CSI content may be greater than the mathematical weight applied to a value in the equation assigned based on the serving cell or sidelink BWP to which the CSI report pertains. In this example, if a UE3 transmits an aperiodic CSI report to the first UE 115-*a*, and a UE2 transmits a periodic CSI report to the first UE 115-*a*, and UE2 has a higher priority than UE3, the periodic CSI report may be prioritized over and may have a greater chance of being included in a UCI payload than the aperiodic CSI report.

Figure 7:
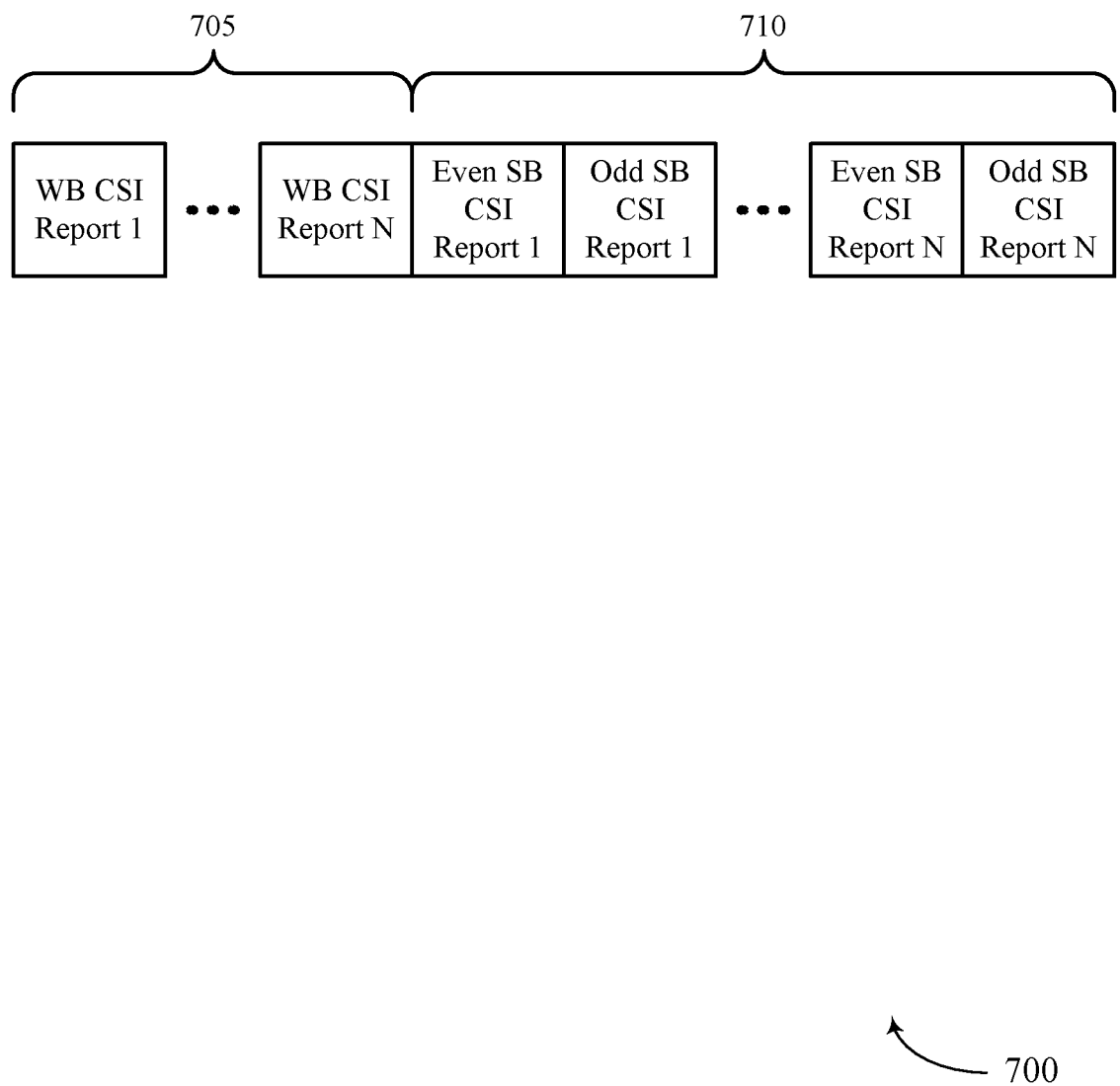
FIG. 7 illustrates an example of the transmission of wideband and subband CSI reports in accordance with aspects of the present disclosure.

FIG. 7 illustrates an example of a transmission 700 of wideband and subband CSI reports in accordance with aspects of the present disclosure. In the example of FIG. 7, the first UE 115-*a* may prioritize sidelink CSI reports based on the priority of the second UEs 115 from which the sidelink CSI reports are received using any of the techniques described above with reference to FIG. 6. Once the CSI reports are prioritized, the first UE 115-*a* may order the wideband CSI reports 705 based on the priorities of the CSI reports for transmission to the base station 105-*a*. The first UE 115-*a* may also order the subband CSI reports 710 based on the priorities of the subband CSI reports for transmission to the base station 105-*a*, where subband CSI reports with a particular report ID for even-numbered subbands are transmitted before CSI reports with the same report ID for odd-numbered subbands. In the example of FIG. 7, the report ID of a CSI report may correspond to the ID of the second UE 115 from which the CSI report is received, or the ID of a set of UEs that includes the second UE 115 from which the CSI report is received, or the ID of a sidelink transmission in which the CSI report is received (e.g., since the CSI reports may be prioritized based on the priorities of the second UEs 115 from which the CSI reports are received).

In the example of FIG. 7, the first UE 115-*a* may be configured to transmit sidelink CSI reports and other CSI reports (e.g., other CSI reports generated by the first UE 115-*a*) separately to the base station 105-*a*. For instance, different (or independent) PUCCH resources or different PUSCH grants may carry sidelink CSI reports (e.g., for sidelink BWPs) and other CSI reports (e.g., for uplink BWPs). As such, the priority rules defined above with reference to FIG. 6 may be applied to sidelink CSI reports, and the priority rules defined above with reference to FIG. 2, for example, may be applied to the other CSI reports (e.g., since the sidelink CSI reports and other CSI reports are separately considered and transmitted in different channels). In this example, however, a first channel (e.g., PUSCH or PUCCH) allocated for transmitting (e.g., forwarding) the sidelink CSI reports may collide with a second channel (e.g., PUSCH or PUCCH) allocated for transmitting the other CSI reports, and it may be appropriate for a UE 115-*a* to be able to determine whether to transmit the sidelink CSI reports on the first channel or the other CSI reports on the second channel.

In some cases, the sidelink CSI reports and the other CSI reports may be prioritized in the case of a collision based on whether the sidelink CSI reports are associated with unicast, groupcast, or broadcast sidelink transmissions. For example, in the case of a collision, if the sidelink CSI reports are to be used to configure unicast sidelink transmissions, the first UE 115-a may transmit the sidelink CSI reports to the base station 105-a and may drop the other CSI reports (e.g., avoid transmitting the other CSI reports). Otherwise, if the sidelink CSI reports are to be used to configure groupcast or broadcast sidelink transmissions, the first UE 115-a may transmit the other CSI reports to the base station 105-a and may drop the sidelink CSI reports. In other cases, the sidelink CSI reports and the other CSI reports may be prioritized in the case of a collision based on whether the other CSI reports are associated with MBB or low latency (e.g., URLLC) transmissions. For example, in the case of a collision, if the other CSI reports are to be used to configure MBB transmissions, the first UE 115-a may transmit the sidelink CSI reports to the base station 105-a and may drop the other CSI reports. Otherwise, if the other CSI reports are to be used to configure low latency transmissions, the first UE 115-a may transmit the other CSI reports to the base station 105-a and may drop the sidelink CSI reports.

Figure 8:
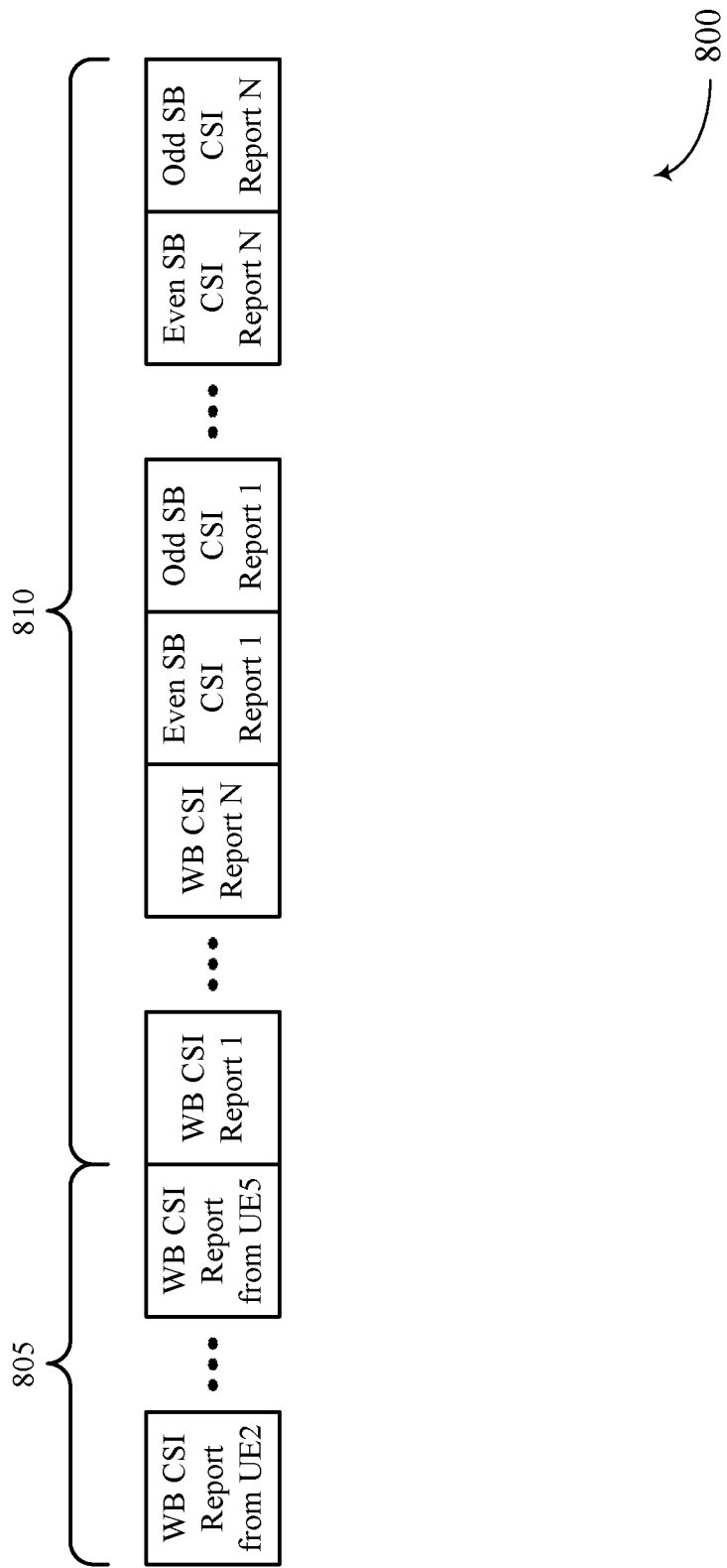
FIG. 8 illustrates an example of the prioritization of sidelink CSI reports over other CSI reports for transmission to a base station in accordance with aspects of the present disclosure.

In another implementation, the first UE 115-a may be configured to transmit sidelink CSI reports with other CSI reports (e.g., generated by the first UE 115-a) in a same channel. In this implementation, the first UE 115-a may prioritize the sidelink CSI reports (or parts of the sidelink CSI reports) over the other CSI reports for transmission to the base station 105-a. FIG. 8 illustrates an example 800 of the prioritization of sidelink CSI reports over other CSI reports for transmission to the base station 105-a in accordance with aspects of the present disclosure. In the example of FIG. 8, the first UE 115-a may map the sidelink CSI reports 805 to the most significant bits of UCI, and the UE 115-a may map the other CSI reports 810 to the remaining bits. That is, the first UE 115-a may transmit the sidelink CSI reports with the priority of wideband CSI which may correspond to a highest priority (e.g., compared to the other CSI reports 810).

Accordingly, if the payload size of the sidelink CSI reports and the other CSI reports exceeds a maximum payload size of a UCI container, the first UE 115-a may omit or drop the lower priority other CSI reports (or a subset of the other CSI reports) before omitting or dropping the sidelink CSI reports. In some cases, the sidelink CSI reports for sidelink BWPs may be added in CSI part 2 of a PUSCH CSI report for uplink BWPs used to transmit the other CSI reports (e.g., since the CSI part 2 may have a variable size). In such cases, the first UE 115-a may receive an indication of an association between the sidelink CSI reports and the PUSCH CSI report such that the first UE 115-a may transmit the sidelink CSI reports with the other CSI reports in the PUSCH. The sidelink CSI reports in the example of FIG. 8 may be wideband sidelink CSI reports, and the wideband sidelink CSI reports may be prioritized over other wideband and subband CSI reports (e.g., generated by the first UE 115-a). In other aspects, the wideband sidelink CSI reports may be prioritized over the other subband CSI reports (e.g., generated by the first UE 115-a), and not the other wideband CSI reports (e.g., generated by the first UE 115-a). That is, the first UE 115-a may prioritize the other wideband CSI reports over the wideband sidelink CSI reports, and the first UE 115-a may prioritize the wideband sidelink CSI reports over the other subband CSI reports.

In some examples, the sidelink CSI reports described above with reference to FIGS. 5-8 may include CSI feedback for widebands and/or subbands, including a sounding reference signal (SRS) resource indicator, a transmit precoder matrix indication (TPMI), and/or a transmit rank indication (TRI) (e.g., if the SRSs are transmitted on SRS resources on multiple ports). In some cases, the first UE 115-a may transmit the CSI reports in a channel (e.g., feedback channel), such as a long format PSFCH or a PSCCH or PSSCH of a sidelink BWP. In other cases, the first UE 115-a may transmit the CSI reports in a PUCCH or PUSCH of an uplink BWP. The first UE 115-a may select a channel on which to transmit a CSI report based on the size of the CSI report and/or whether an ACK or NACK is to be reported. The CSI report may include an RSRP, a received signal strength indication (RSSI), or a signal-to-interference-plus-noise ratio (SINR). In addition, as mentioned above, the CSI report may also include an RI or TPMI to be used by a transmit UE 115 (e.g., if the SRS resource that was measured was multi-port). In some examples, the beam used on the PSCCH or PSSCH may be the beam trained using the received SRS.

Example 1 is a method for wireless communication at a UE that includes determining a priority associated with each of a plurality of second UEs in sidelink communications with the first UE, receiving a plurality of sidelink channel state information reports from the plurality of second UEs, prioritizing each sidelink channel state information report of the plurality of sidelink channel state information reports based at least in part on the priority of a corresponding second UE from which the sidelink channel state information report is received, and transmitting at least a subset of the plurality of sidelink channel state information reports to a network entity based at least in part on the prioritizing.

In example 2, the method of example 1 includes receiving an indication of the priority associated with each of the plurality of second UEs.

In example 3, the method of any of examples 1-2 includes determining that a first payload size of the plurality of sidelink channel state information reports exceeds a maximum size of a transmission container, omitting at least a part of one or more of the plurality of sidelink channel state information reports from the transmission, and transmitting the subset of the plurality of sidelink channel state information reports based at least in part on the omitting, wherein a second payload size of the subset of the plurality of sidelink channel state information reports is smaller than or equal to the maximum size of the transmission container.

In example 4, the method of any of examples 1-3 includes assigning a report configuration identification (ID) to each sidelink channel state information report of the plurality of sidelink channel state information reports based at least in part on the priority of the corresponding second UE from which the channel state information report is received and prioritizing each sidelink channel state information report of the plurality of sidelink channel state information reports based at least in part on the assigned report configuration ID.

In example 5, and in the method of any of examples 1-4, the priority of the corresponding second UE is associated with an ID of the corresponding second UE from which the sidelink channel state information report is received, a priority associated with an ID of a group of second UEs that includes the corresponding second UE from which the sidelink channel state information report is received, or a priority associated with an ID of sidelink communications between the first UE and the corresponding second UE.

In example 6, the method of any of examples 1-5 includes prioritizing each sidelink channel state information report of the plurality of sidelink channel state information reports based at least in part on the priority of the corresponding second UE from which the sidelink channel state information report is received and one or more other factors.

In example 7, the method of any of examples 1-6 includes determining a priority value to assign to each sidelink channel state information report of the plurality of sidelink channel state information reports based at least in part on the priority of the corresponding second UE from which the sidelink channel state information report is received and the one or more other factors and assigning the priority value to the sidelink channel state information report.

In example 8, the method of any of examples 1-7 includes determining the priority value to assign to each sidelink channel state information report of the plurality of sidelink channel state information reports based at least in part on a first value representing the priority of the corresponding second UE from which the channel state information report is received, and a first mathematical weight applied to the first value and a second value representing each of the one or more other factors and a second mathematical weight applied to the second value.

In example 9, and in the method of any of examples 1-8, each second mathematical weight is greater than the first mathematical weight such that the one or more other factors are more impactful on the priority value assigned to each sidelink channel state information report than the priority of the corresponding second UE from which the sidelink channel state information report is received.

In example 10, and in the method of any of examples 1-9, the first mathematical weight is greater than each second mathematical weight such that the priority of the second UE from which each sidelink channel state information report is received is more impactful on the priority value assigned to each sidelink channel state information report than the one or more other factors.

In example 11, and in the method of any of examples 1-10, a lower priority value is associated with a higher priority.

In example 12, and in the method of any of examples 1-11, the one or more other factors comprise one or more of a time domain configuration associated with the sidelink channel state information report received from the corresponding second UE, a physical channel on which the sidelink channel state information report is received from the corresponding second UE, a content of the sidelink channel state information report received from the corresponding second UE, a serving cell to which the sidelink channel state information report received from the corresponding second UE pertains, or a bandwidth part to which the sidelink channel state information report received from the corresponding second UE pertains.

In example 13, and in the method of any of examples 1-12, the time domain configuration associated with the sidelink channel state information report comprises an aperiodic configuration, a periodic configuration, or a semi-persistent configuration.

In example 14, and in the method of any of examples 1-13, the physical channel on which the sidelink channel state information report is received from the second UE comprises a PSSCH, a PSCCH, or a PSFCH.

In example 15, and in the method of any of examples 1-14, the content of the sidelink channel state information report received from the corresponding second UE comprises beam information or other information.

In example 16, and in the method of any of examples 1-15, the serving cell to which the sidelink channel state information report received from the corresponding second UE corresponds comprises a primary cell or a secondary cell.

In example 17, the method of any of examples 1-16 includes determining that a first channel allocated for transmitting at least the subset of the plurality of sidelink channel state information reports collides with a second channel allocated for transmitting other channel state information reports and determining whether to transmit at least the subset of the plurality of sidelink channel state information reports on the first channel or the other channel state information reports on the second channel.

In example 18, the method of any of examples 1-17 includes determining that the plurality of sidelink channel state information reports are associated with unicast sidelink transmissions and transmitting at least the subset of the plurality of sidelink channel state information reports on the first channel.

In example 19, the method of any of examples 1-18 includes determining that the plurality of sidelink channel state information reports are associated with groupcast or broadcast sidelink transmissions and transmitting the other channel state information reports on the second channel.

In example 20, the method of any of examples 1-19 includes determining that the other channel state information reports are associated with mobile broadband communications and transmitting at least the subset of the plurality of sidelink channel state information reports on the first channel.

In example 21, the method of any of examples 1-20 includes determining that the other channel state information reports are associated with low latency communications and transmitting the other channel state information reports on the second channel.

Example 22 is a method for wireless communication at a base station that includes identifying a first UE in sidelink communications with a plurality of second UEs, transmitting, to the first UE, an indication of a priority associated with each of the plurality of second UEs, and receiving, from the first UE, at least a subset of a plurality of sidelink channel state information reports generated by the plurality of second UEs, wherein the plurality of sidelink channel state information reports are prioritized based at least in part on the indicated priority of each of the plurality of second UEs.

In example 23, and in the method of example 22, the priority of each of the plurality of second UEs corresponds to a priority associated with an ID of the second UE, a priority associated with an ID of a group of second UEs that includes the second UE, or a priority associated with an ID of sidelink communications between the first UE and the second UE.

In example 24, and in the method of any of examples 22 and 23, a report configuration ID is assigned to each sidelink channel state information report of the plurality of sidelink channel state information reports based at least in part on the priority of the second UE that generated the sidelink channel state information report, and each sidelink channel state information report of the plurality of sidelink channel state information reports is prioritized based at least in part on the assigned report configuration ID.

Example 25 is a method for wireless communication at a first UE that includes receiving one or more sidelink channel state information reports from one or more second UEs, identifying at least one channel state information report pertaining to channel quality between the first UE and a network entity and generated by the first UE to be transmitted to the network entity, determining at least a subset of the at least one channel state information report to transmit in a same channel with the one or more sidelink channel state information reports, and transmitting, in the same channel, the one or more sidelink channel state information reports received from the one or more second UEs and at least a subset of the at least one channel state information report generated by the first UE.

In example 26, the method of example 25 includes receiving an indication of an association between the one or more sidelink channel state information reports received from the one or more second UEs and the at least one channel state information report generated by the first UE and transmitting, in the same channel, the one or more sidelink channel state information reports received from the one or more second UEs and at least the subset of the at least one channel state information report generated by the first UE based at least in part on receiving the indication.

In example 27, the method of any of examples 25 and 26 includes prioritizing one or more parts of the one or more sidelink channel state information reports received from the one or more second UEs over the at least one channel state information report generated by the first UE, wherein determining at least the subset of the at least one channel state information report to transmit in the same channel is based at least in part on the prioritizing.

In example 28, and in the method of any of examples 25-27, the one or more parts of the one or more sidelink channel state information reports received from the one or more second UEs comprise wideband sidelink channel state information reports received from the one or more second UEs.

In example 29, and in the method of any of examples 25-28, the wideband sidelink channel state information reports received from the one or more second UEs are prioritized over wideband channel state information reports generated by the first UE.

In example 30, and in the method of any of examples 25-29, the wideband sidelink channel state information reports received from the one or more second UEs are prioritized over subband channel state information reports generated by the first UE.

In example 31, and in the method of any of examples 25-30, the one or more sidelink channel state information reports received from the one or more second UEs and at least the subset of the at least one channel state information report generated by the first UE are transmitted in part two of a physical uplink shared channel transmission.

In example 32, and in the method of any of examples 25-31, the part two of the physical uplink shared channel transmission has a variable size.

Example 33 is a method for wireless communication at a base station that includes identifying a first UE in sidelink communications with one or more second UEs, transmitting an indication of an association between one or more sidelink channel state information reports generated by the one or more second UEs and channel state information reports pertaining to channel quality between the first UE and the base station and generated by the first UE, and receiving, from the first UE in a same channel, the one or more sidelink channel state information reports generated by the one or more second UEs and the channel state information reports generated by the first UE, wherein one or more parts of the one or more sidelink channel state information reports generated by the one or more second UEs are prioritized over the channel state information reports generated by the first UE.

In example 34, and in the method of example 33, the one or more parts of the one or more sidelink channel state information reports generated by the one or more second UEs comprise wideband sidelink channel state information reports generated by the one or more second UEs.

In example 35, and in the method of any of examples 33 and 34, the wideband sidelink channel state information reports generated by the one or more second UEs are prioritized over wideband channel state information reports generated by the first UE.

In example 36, and in the method of any of examples 33-35, the wideband sidelink channel state information reports generated by the one or more second UEs are prioritized over subband channel state information reports generated by the first UE.

In example 37, and in the method of any of examples 33-36, the one or more sidelink channel state information reports generated by the one or more second UEs and at least the subset of the channel state information reports generated by the first UE are received in part two of a physical uplink shared channel transmission.

In example 38, and in the method of any of examples 33-37, the part two of the physical uplink shared channel transmission has a variable size.

Example 39 is a system or apparatus including one or more processors and memory in electronic communication with the one or more processors storing instructions executable by the one or more processors to cause the system or apparatus to implement a method as in any of examples 1-21.

Example 40 is a system or apparatus including one or more processors and memory in electronic communication with the one or more processors storing instructions executable by the one or more processors to cause the system or apparatus to implement a method as in any of examples 22-24.

Example 41 is a system or apparatus including one or more processors and memory in electronic communication with the one or more processors storing instructions executable by the one or more processors to cause the system or apparatus to implement a method as in any of examples 25-32.

Example 42 is a system or apparatus including one or more processors and memory in electronic communication with the one or more processors storing instructions executable by the one or more processors to cause the system or apparatus to implement a method as in any of examples 33-38.

Example 43 is a system or apparatus including means for implementing a method or realizing an apparatus as in any of examples 1-21.

Example 44 is a system or apparatus including means for implementing a method or realizing an apparatus as in any of examples 22-24.

Example 45 is a system or apparatus including means for implementing a method or realizing an apparatus as in any of examples 25-32.

Example 46 is a system or apparatus including means for implementing a method or realizing an apparatus as in any of examples 33-38.

Example 47 is a non-transitory computer-readable medium storing instructions executable by one or more processors to cause the one or more processors to implement a method as in any of examples 1-21.

Example 48 is a non-transitory computer-readable medium storing instructions executable by one or more processors to cause the one or more processors to implement a method as in any of examples 22-24.

Example 49 is a non-transitory computer-readable medium storing instructions executable by one or more processors to cause the one or more processors to implement a method as in any of examples 25-32.

Example 50 is a non-transitory computer-readable medium storing instructions executable by one or more processors to cause the one or more processors to implement a method as in any of examples 33-38. Aspects of the above examples may be combined with aspects of the other examples, embodiments, or teaching disclosed herein.

Figure 9:
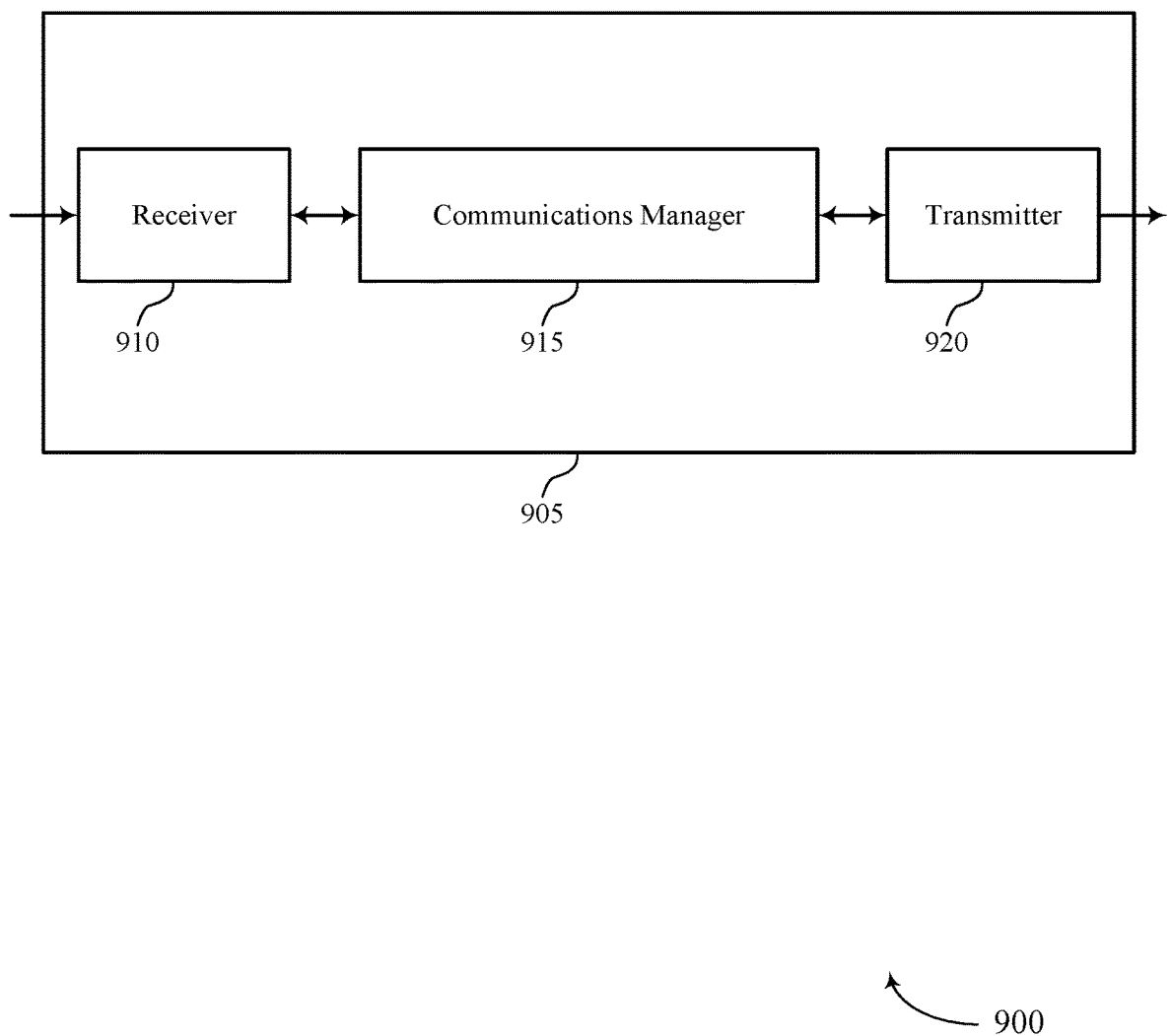
FIGS. 9 and 10 show block diagrams of devices that support CSI report aggregation and UCI multiplexing for sidelink communications in accordance with aspects of the present disclosure.

FIG. 9 shows a block diagram 900 of a device 905 that supports CSI report aggregation and UCI multiplexing for sidelink communications in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to CSI report aggregation and UCI multiplexing for sidelink communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a priority associated with each of a set of second UEs in sidelink communications with the first UE, receive a set of sidelink channel state information reports from the set of second UEs, prioritize each sidelink channel state information report of the set of sidelink channel state information reports based on the priority of a corresponding second UE from which the sidelink channel state information report is received; and transmit at least a subset of the set of sidelink channel state information reports to the network entity based on the prioritizing.

The communications manager 915 may also receive one or more sidelink channel state information reports from one or more second UEs to be forwarded to a base station, identify at least one channel state information report pertaining to channel quality between the first UE and the base station and generated by the first UE to be transmitted to the base station, transmit, in a same channel, the one or more sidelink channel state information reports received from the one or more second UEs and at least a subset of the at least one channel state information report generated by the first UE, and prioritize one or more parts of the one or more sidelink channel state information reports received from the one or more second UEs over the at least one channel state information report generated by the first UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 915 as described herein may be implemented to realize one or more potential advantages. One implementation may allow a sidelink UE to prioritize sidelink CSI reports appropriately. Accordingly, a base station may be able to receive, from a first UE (e.g., that includes the communications manager 915), high priority sidelink reports generated by one or more second UEs and efficiently configure sidelink communications between the first UE and the one or more second UEs. Thus, the throughput for high priority sidelink communications may be improved. Further, in some cases, a processor at the first UE and the base station may avoid processing low priority sidelink CSI reports. In addition, because the CSI reports may be used to configure, for example, a transmit power used by the first UE, the first UE may avoid wasting power for sidelink transmissions while maintaining the reliability for the sidelink transmissions (e.g., enabling a second UE (which may also include the communications manager 915) to successfully receive sidelink transmissions from the first UE and avoid having to request additional retransmissions).

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
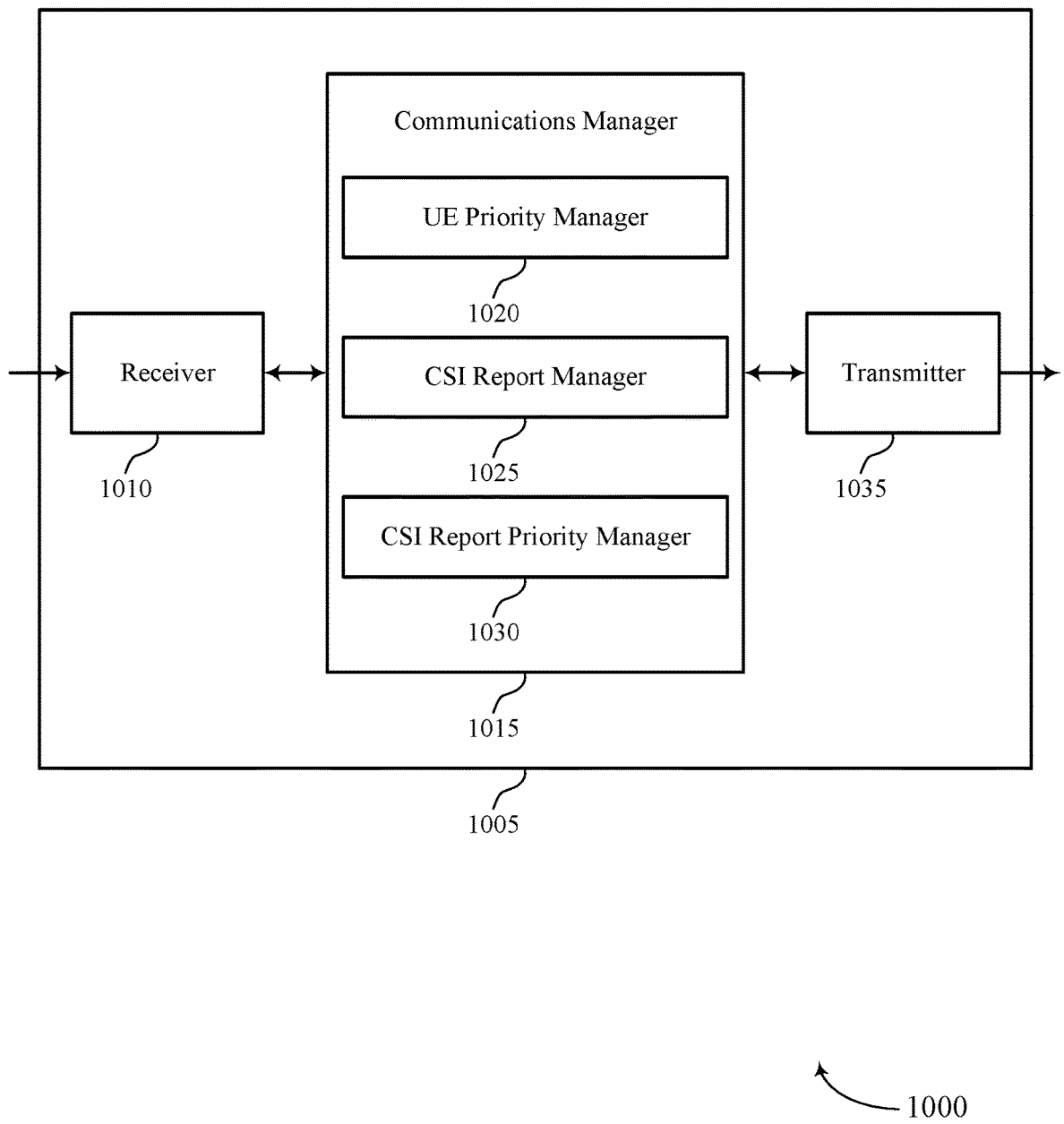

FIG. 10 shows a block diagram 1000 of a device 1005 that supports CSI report aggregation and UCI multiplexing for sidelink communications in accordance with aspects of the present disclosure. The device 1005 may be an example of aspects of a device 905, or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to CSI report aggregation and UCI multiplexing for sidelink communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a UE priority manager 1020, a CSI report manager 1025, and a CSI report priority manager 1030. The communications manager 1015 may be an example of aspects of the communications manager 1210 described herein.

The UE priority manager 1020 may determine a priority associated with each of a set of second UEs in sidelink communications with the first UE. The CSI report manager 1025 may receive a set of sidelink channel state information reports from the set of second UEs. The CSI report priority manager 1030 may prioritize each sidelink channel state information report of the set of sidelink channel state information reports based on the priority of a corresponding second UE from which the sidelink channel state information report is received. The CSI report manager 1025 may transmit at least a subset of the set of sidelink channel state information reports to a network entity based on the prioritizing.

The CSI report manager 1025 may receive one or more sidelink channel state information reports from one or more second UEs to be forwarded to a base station and identify at least one channel state information report pertaining to channel quality between the first UE and the base station and generated by the first UE to be transmitted to the base station. The CSI report priority manager 1030 may prioritize one or more parts of the one or more sidelink channel state information reports received from the one or more second UEs over the at least one channel state information report generated by the first UE. The CSI report manager 1025 may transmit, in a same channel, the one or more sidelink channel state information reports received from the one or more second UEs and at least a subset of the at least one channel state information report generated by the first UE The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
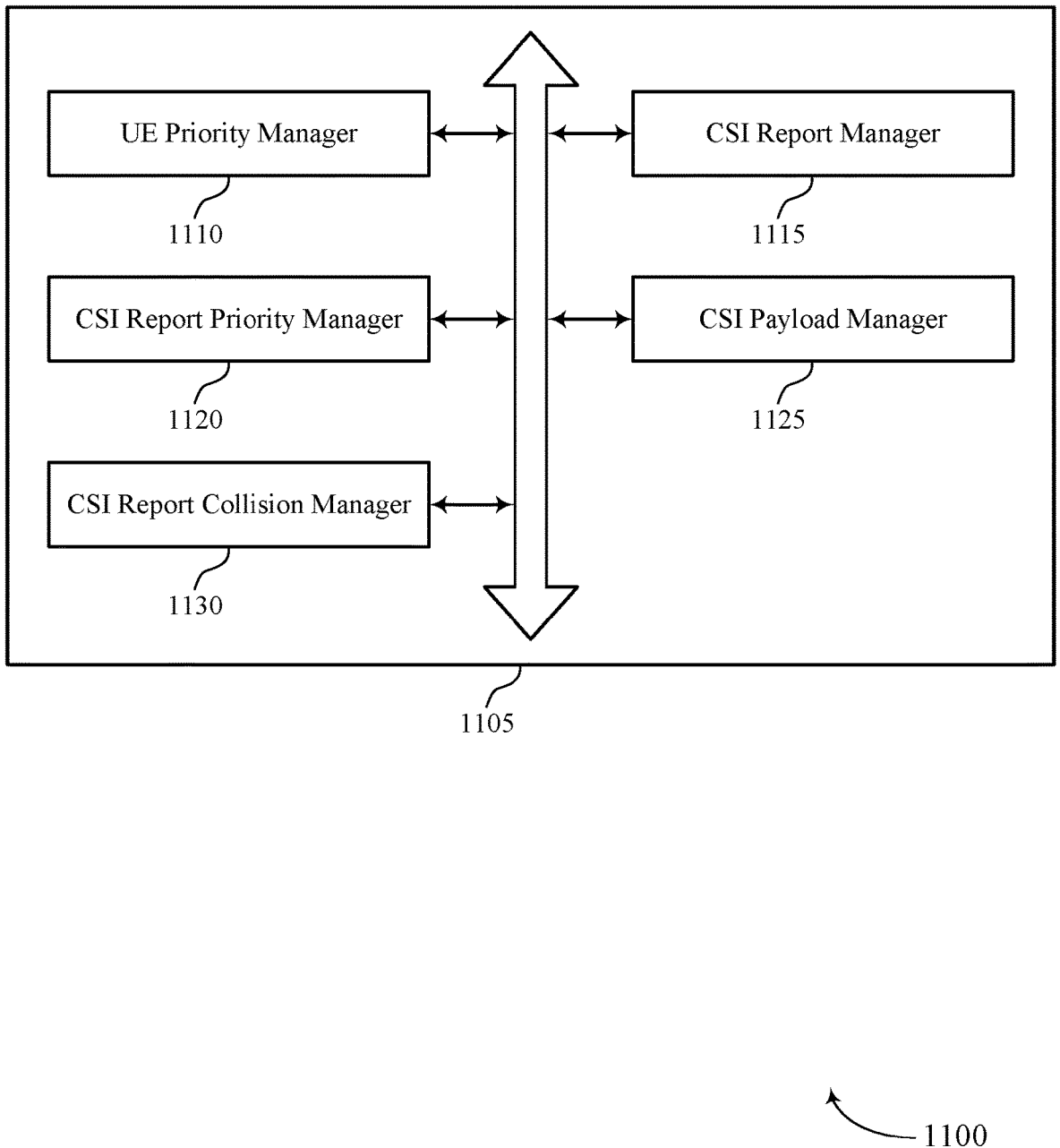
FIG. 11 shows a block diagram of a communications manager that supports CSI report aggregation and UCI multiplexing for sidelink communications in accordance with aspects of the present disclosure.

FIG. 11 shows a block diagram 1100 of a communications manager 1105 that supports CSI report aggregation and UCI multiplexing for sidelink communications in accordance with aspects of the present disclosure. The communications manager 1105 may be an example of aspects of a communications manager 915, a communications manager 1015, or a communications manager 1210 described herein. The communications manager 1105 may include a UE priority manager 1110, a CSI report manager 1115, a CSI report priority manager 1120, a CSI payload manager 1125, and a CSI report collision manager 1130. Each of these modules may communicate, directly or indirectly, with one another (e.g., via one or more buses).

The UE priority manager 1110 may determine a priority associated with each of a set of second UEs in sidelink communications with the first UE. In some examples, the UE priority manager 1110 may receive an indication of the priority associated with each of the set of second UEs. In some cases, the priority of the corresponding second UE is associated with an ID of the corresponding second UE from which the sidelink channel state information report is received, a priority associated with an ID of a group of second UEs that includes the corresponding second UE from which the sidelink channel state information report is received, or a priority associated with an ID of sidelink communications between the first UE and the corresponding second UE.

The CSI report manager 1115 may receive a set of sidelink channel state information reports from the set of second UEs \. In some examples, the CSI report manager 1115 may transmit at least a subset of the set of sidelink channel state information reports to a network entity based on the prioritizing. In some examples, the CSI report manager 1115 may receive one or more sidelink channel state information reports from one or more second UEs. In some examples, the CSI report manager 1115 may identify at least one channel state information report pertaining to channel quality between the first UE and the base station and generated by the first UE to be transmitted to a network entity. In some examples, the CSI report manager 1115 may determine at least a subset of the at least one channel state information report to transmit in a same channel with the one or more sidelink channel state information reports.

In some examples, the CSI report manager 1115 may transmit, in the same channel, the one or more sidelink channel state information reports received from the one or more second UEs and at least a subset of the at least one channel state information report generated by the first UE. In some examples, the CSI report manager 1115 may omit at least a part of one or more of the set of sidelink channel state information reports from the transmission. In some examples, the CSI report manager 1115 may transmit the subset of the set of sidelink channel state information reports based on the omitting, where a second payload size of the subset of the set of sidelink channel state information reports is smaller than or equal to the maximum size of the transmission container. In some examples, the CSI report manager 1115 may transmit at least the subset of the set of sidelink channel state information reports on the first channel. In some examples, the CSI report manager 1115 may transmit the other channel state information reports on the second channel.

In some examples, the CSI report manager 1115 may receive an indication of an association between the one or more sidelink channel state information reports received from the one or more second UEs and the at least one channel state information report generated by the first UE. In some examples, the CSI report manager 1115 may transmit, in the same channel, the one or more sidelink channel state information reports received from the one or more second UEs and at least the subset of the at least one channel state information report generated by the first UE based on receiving the indication. In some cases, the one or more parts of the one or more sidelink channel state information reports received from the one or more second UEs include wideband sidelink channel state information reports received from the one or more second UEs.

In some cases, the wideband sidelink channel state information reports received from the one or more second UEs are prioritized over wideband channel state information reports generated by the first UE. In some cases, the wideband sidelink channel state information reports received from the one or more second UEs are prioritized over subband channel state information reports generated by the first UE. In some cases, the one or more sidelink channel state information reports received from the one or more second UEs and at least the subset of the at least one channel state information report generated by the first UE are transmitted in part two of a physical uplink shared channel transmission. In some cases, the part two of the physical uplink shared channel transmission has a variable size.

The CSI report priority manager 1120 may prioritize each sidelink channel state information report of the set of sidelink channel state information reports based on the priority of a corresponding second UE from which the sidelink channel state information report is received. In some examples, the CSI report priority manager 1120 may prioritize one or more parts of the one or more sidelink channel state information reports received from the one or more second UEs over the at least one channel state information report generated by the first UE. In such examples, determining at least the subset of the at least one channel state information report to transmit in the same channel is based at least in part on the prioritizing. In some examples, the CSI report priority manager 1120 may assign a report configuration ID to each sidelink channel state information report of the set of sidelink channel state information reports based on the priority of the corresponding second UE from which the channel state information report is received. In some examples, the CSI report priority manager 1120 may prioritize each sidelink channel state information report of the set of sidelink channel state information reports based on the assigned report configuration ID.

In some examples, the CSI report priority manager 1120 may prioritize each sidelink channel state information report of the set of sidelink channel state information reports based on the priority of the corresponding second UE from which the sidelink channel state information report is received and one or more other factors. In some examples, the CSI report priority manager 1120 may determine a priority value to assign to each sidelink channel state information report of the set of sidelink channel state information reports based on the priority of the corresponding second UE from which the sidelink channel state information report is received and the one or more other factors. In some examples, the CSI report priority manager 1120 may assign the priority value to the sidelink channel state information report. In some examples, the CSI report priority manager 1120 may determine the priority value to assign to each sidelink channel state information report of the set of sidelink channel state information reports based on.

In some cases, each second mathematical weight is greater than the first mathematical weight such that the one or more other factors are more impactful on the priority value assigned to each sidelink channel state information report than the priority of the corresponding second UE from which the sidelink channel state information report is received. In some cases, the first mathematical weight is greater than each second mathematical weight such that the priority of the second UE from which each sidelink channel state information report is received is more impactful on the priority value assigned to each sidelink channel state information report than the one or more other factors. In some cases, a lower priority value is associated with a higher priority.

In some cases, the one or more other factors include one or more of a time domain configuration associated with the sidelink channel state information report received from the corresponding second UE, a physical channel on which the sidelink channel state information report is received from the corresponding second UE, a content of the sidelink channel state information report received from the corresponding second UE, a serving cell to which the sidelink channel state information report received from the corresponding second UE pertains, or a bandwidth part to which the sidelink channel state information report received from the corresponding second UE pertains.

In some cases, the time domain configuration associated with the sidelink channel state information report includes an aperiodic configuration, a periodic configuration, or a semi-persistent configuration. In some cases, the physical channel on which the sidelink channel state information report is received from the second UE includes a PSSCH, a PSCCH, or a PSFCH. In some cases, the content of the sidelink channel state information report received from the corresponding second UE includes beam information or other information. In some cases, the serving cell to which the sidelink channel state information report received from the corresponding second UE corresponds includes a primary cell or a secondary cell.

The CSI payload manager 1125 may determine that a first payload size of the set of sidelink channel state information reports exceeds a maximum size of a transmission container. The CSI report collision manager 1130 may determine that a first channel allocated for transmitting at least the subset of the set of sidelink channel state information reports collides with a second channel allocated for transmitting other channel state information reports. In some examples, the CSI report collision manager 1130 may determine whether to transmit at least the subset of the plurality of sidelink channel state information reports on the first channel or the other channel state information reports on the second channel. In some examples, the CSI report collision manager 1130 may determine that the set of sidelink channel state information reports are associated with unicast sidelink transmissions.

In some examples, the CSI report collision manager 1130 may determine that the set of sidelink channel state information reports are associated with groupcast or broadcast sidelink transmissions. In some examples, the CSI report collision manager 1130 may determine that the other channel state information reports are associated with mobile broadband communications. In some examples, the CSI report collision manager 1130 may determine that the other channel state information reports are associated with low latency communications.

Figure 12:
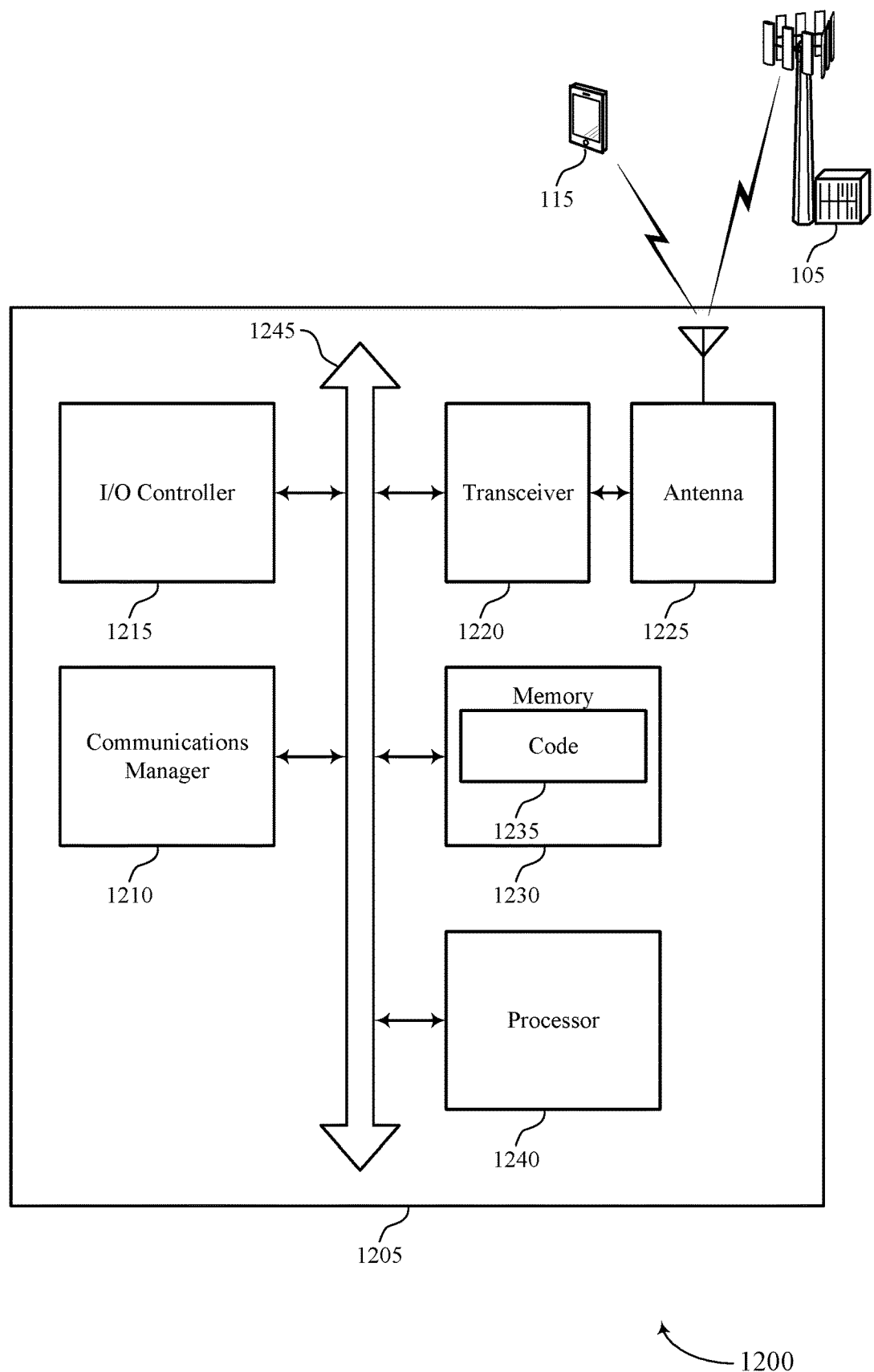
FIG. 12 shows a diagram of a system including a device that supports CSI report aggregation and UCI multiplexing for sidelink communications in accordance with aspects of the present disclosure.

FIG. 12 shows a diagram of a system 1200 including a device 1205 that supports CSI report aggregation and UCI multiplexing for sidelink communications in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may determine a priority associated with each of a set of second UEs in sidelink communications with the first UE, receive a set of sidelink channel state information reports from the set of second UEs to be forwarded to a base station, transmit at least a subset of the set of sidelink channel state information reports to the base station based on the prioritizing, and prioritize each sidelink channel state information report of the set of sidelink channel state information reports based on the priority of a corresponding second UE from which the sidelink channel state information report is received.

The communications manager 1210 may also receive one or more sidelink channel state information reports from one or more second UEs to be forwarded to a base station, identify at least one channel state information report pertaining to channel quality between the first UE and the base station and generated by the first UE to be transmitted to the base station, transmit, in a same channel, the one or more sidelink channel state information reports received from the one or more second UEs and at least a subset of the at least one channel state information report generated by the first UE, and prioritize one or more parts of the one or more sidelink channel state information reports received from the one or more second UEs over the at least one channel state information report generated by the first UE.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting CSI report aggregation and UCI multiplexing for sidelink communications).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
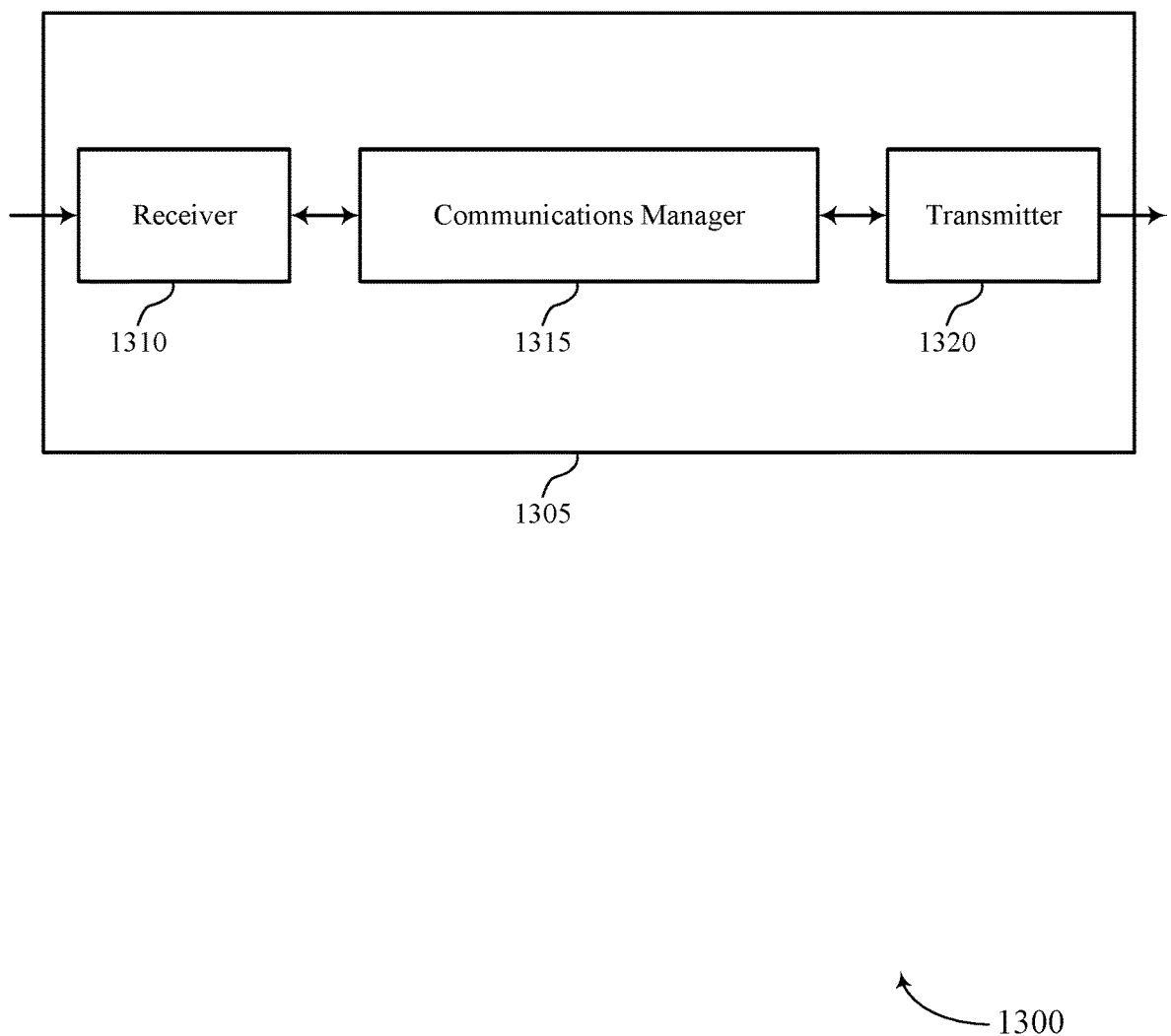
FIGS. 13 and 14 show block diagrams of devices that support CSI report aggregation and UCI multiplexing for sidelink communications in accordance with aspects of the present disclosure.

FIG. 13 shows a block diagram 1300 of a device 1305 that supports CSI report aggregation and UCI multiplexing for sidelink communications in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to CSI report aggregation and UCI multiplexing for sidelink communications, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify a first UE in sidelink communications with a set of second UEs, transmit, to the first UE, an indication of a priority associated with each of the set of second UEs, and receive, from the first UE, at least a subset of a set of sidelink channel state information reports generated by the set of second UEs, where the set of sidelink channel state information reports are prioritized based on the indicated priority of each of the set of second UEs.

The communications manager 1315 may also identify a first UE in sidelink communications with one or more second UEs, transmit an indication of an association between one or more sidelink channel state information reports generated by the one or more second UEs and channel state information reports pertaining to channel quality between the first UE and the base station and generated by the first UE, and receive, from the first UE in a same channel, the one or more sidelink channel state information reports generated by the one or more second UEs and the channel state information reports generated by the first UE, where one or more parts of the one or more sidelink channel state information reports generated by the one or more second UEs are prioritized over the channel state information reports generated by the first UE. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
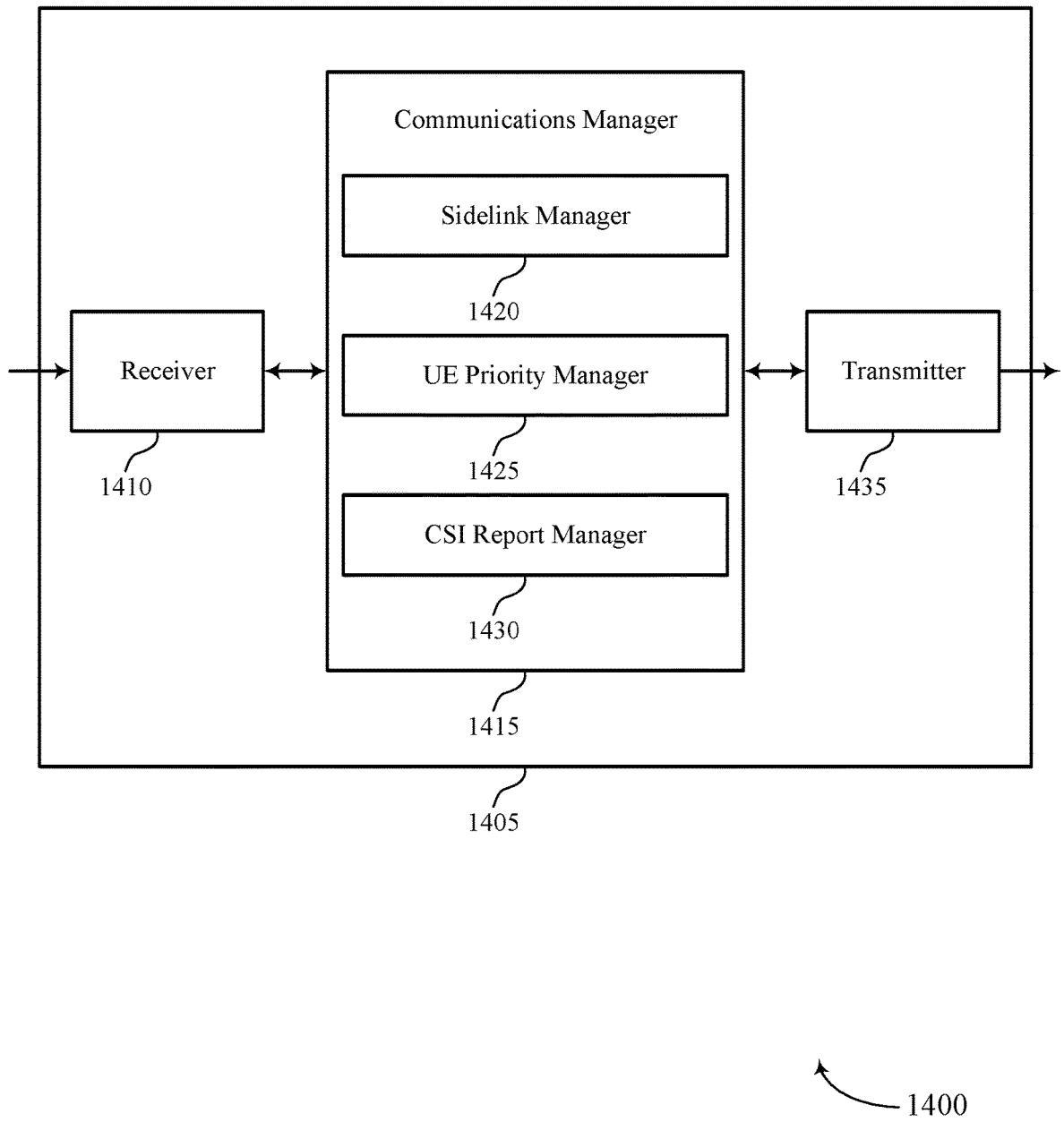

FIG. 14 shows a block diagram 1400 of a device 1405 that supports CSI report aggregation and UCI multiplexing for sidelink communications in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to CSI report aggregation and UCI multiplexing for sidelink communications, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a sidelink manager 1420, a UE priority manager 1425, and a CSI report manager 1430. The communications manager 1415 may be an example of aspects of the communications manager 1610 described herein.

The sidelink manager 1420 may identify a first UE in sidelink communications with a set of second UEs. The UE priority manager 1425 may transmit, to the first UE, an indication of a priority associated with each of the set of second UEs. The CSI report manager 1430 may receive, from the first UE, at least a subset of a set of sidelink channel state information reports generated by the set of second UEs, where the set of sidelink channel state information reports are prioritized based on the indicated priority of each of the set of second UEs.

The sidelink manager 1420 may identify a first UE in sidelink communications with one or more second UEs. The CSI report manager 1430 may transmit an indication of an association between one or more sidelink channel state information reports generated by the one or more second UEs and channel state information reports pertaining to channel quality between the first UE and the base station and generated by the first UE and receive, from the first UE in a same channel, the one or more sidelink channel state information reports generated by the one or more second UEs and the channel state information reports generated by the first UE, where one or more parts of the one or more sidelink channel state information reports generated by the one or more second UEs are prioritized over the channel state information reports generated by the first UE.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
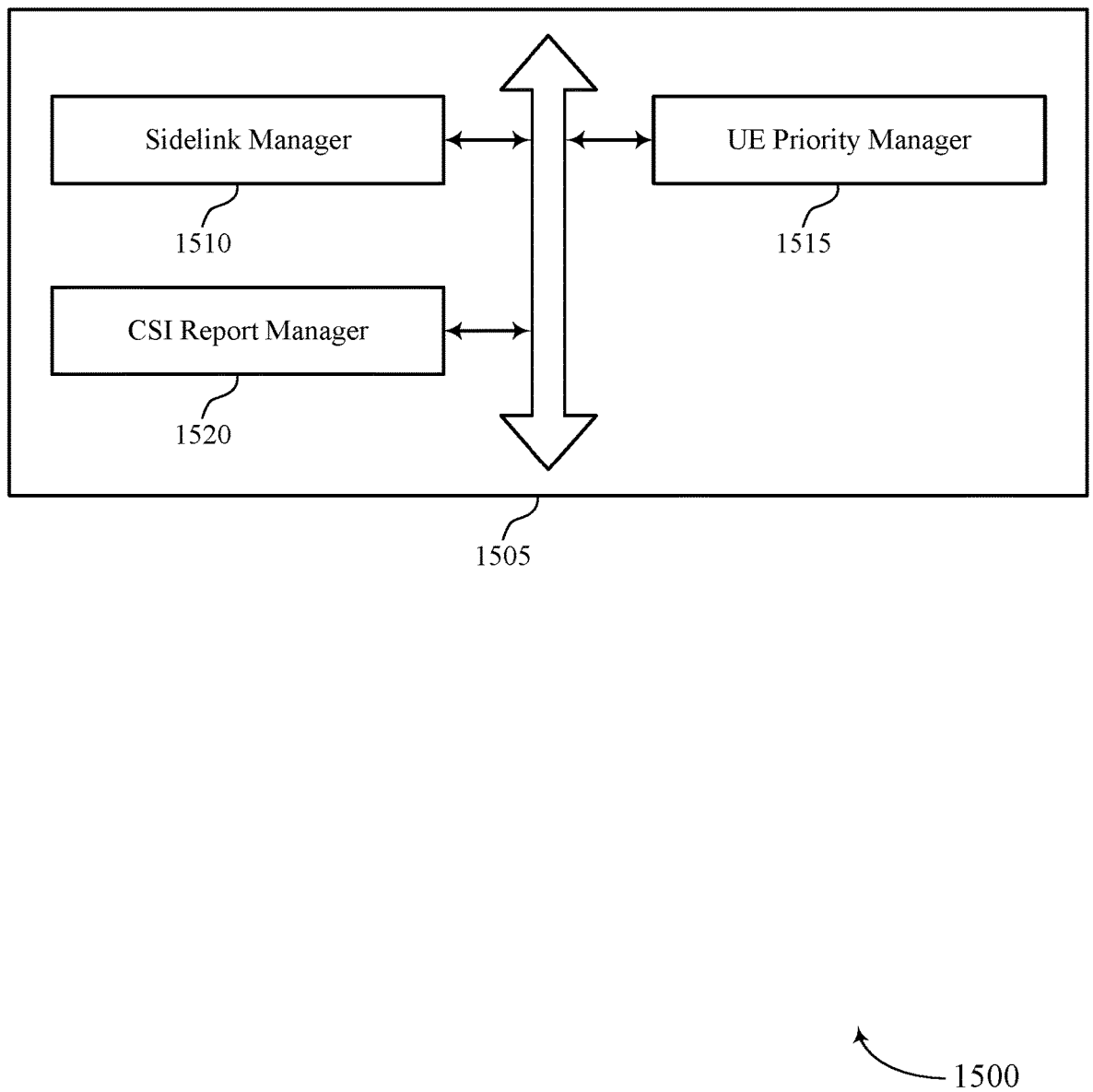
FIG. 15 shows a block diagram of a communications manager that supports CSI report aggregation and UCI multiplexing for sidelink communications in accordance with aspects of the present disclosure.

FIG. 15 shows a block diagram 1500 of a communications manager 1505 that supports CSI report aggregation and UCI multiplexing for sidelink communications in accordance with aspects of the present disclosure. The communications manager 1505 may be an example of aspects of a communications manager 1315, a communications manager 1415, or a communications manager 1610 described herein. The communications manager 1505 may include a sidelink manager 1510, a UE priority manager 1515, and a CSI report manager 1520. Each of these modules may communicate, directly or indirectly, with one another (e.g., via one or more buses).

The sidelink manager 1510 may identify a first UE in sidelink communications with a set of second UEs. In some examples, the sidelink manager 1510 may identify a first UE in sidelink communications with one or more second UEs. The UE priority manager 1515 may transmit, to the first UE, an indication of a priority associated with each of the set of second UEs. The CSI report manager 1520 may receive, from the first UE, at least a subset of a set of sidelink channel state information reports generated by the set of second UEs, where the set of sidelink channel state information reports are prioritized based on the indicated priority of each of the set of second UEs.

In some examples, the CSI report manager 1520 may transmit an indication of an association between one or more sidelink channel state information reports generated by the one or more second UEs and channel state information reports pertaining to channel quality between the first UE and the base station and generated by the first UE. In some examples, the CSI report manager 1520 may receive, from the first UE in a same channel, the one or more sidelink channel state information reports generated by the one or more second UEs and the channel state information reports generated by the first UE, where one or more parts of the one or more sidelink channel state information reports generated by the one or more second UEs are prioritized over the channel state information reports generated by the first UE.

In some cases, the priority of each of the set of second UEs corresponds to a priority associated with an ID of the second UE, a priority associated with an ID of a group of second UEs that includes the second UE, or a priority associated with an ID of sidelink communications between the first UE and the second UE. In some cases, a report configuration ID is assigned to each sidelink channel state information report of the set of sidelink channel state information reports based on the priority of the second UE that generated the sidelink channel state information report, and each sidelink channel state information report of the set of sidelink channel state information reports is prioritized based on the assigned report configuration ID. In some cases, the one or more parts of the one or more sidelink channel state information reports generated by the one or more second UEs include wideband sidelink channel state information reports generated by the one or more second UEs.

In some cases, the wideband sidelink channel state information reports generated by the one or more second UEs are prioritized over wideband channel state information reports generated by the first UE. In some cases, the wideband sidelink channel state information reports generated by the one or more second UEs are prioritized over subband channel state information reports generated by the first UE. In some cases, the one or more sidelink channel state information reports generated by the one or more second UEs and at least the subset of the channel state information reports generated by the first UE are received in part two of a physical uplink shared channel transmission. In some cases, the part two of the physical uplink shared channel transmission has a variable size.

Figure 16:
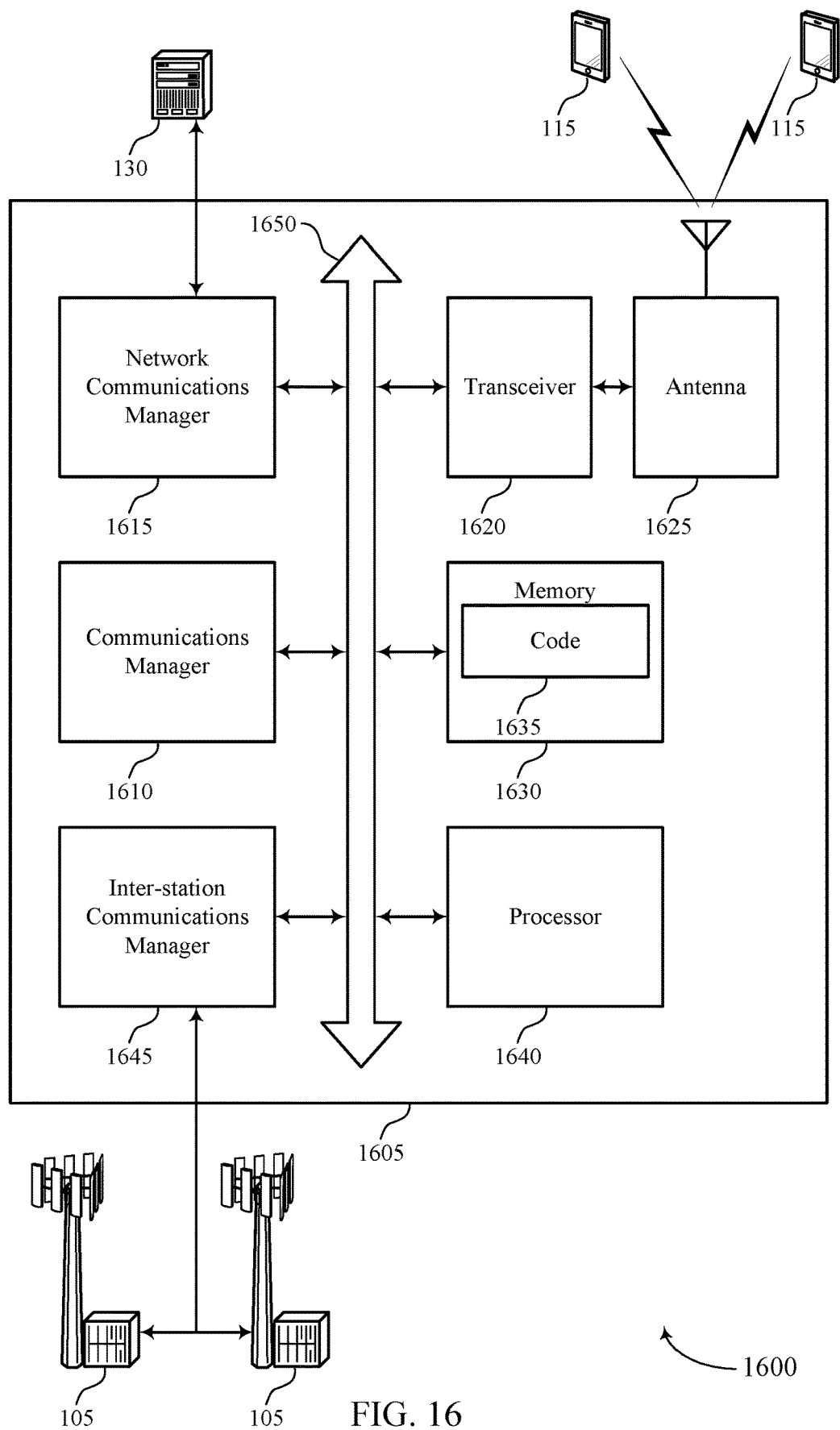
FIG. 16 shows a diagram of a system including a device that supports CSI report aggregation and UCI multiplexing for sidelink communications in accordance with aspects of the present disclosure.

FIG. 16 shows a diagram of a system 1600 including a device 1605 that supports CSI report aggregation and UCI multiplexing for sidelink communications in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may identify a first UE in sidelink communications with a set of second UEs, transmit, to the first UE, an indication of a priority associated with each of the set of second UEs, and receive, from the first UE, at least a subset of a set of sidelink channel state information reports generated by the set of second UEs, where the set of sidelink channel state information reports are prioritized based on the indicated priority of each of the set of second UEs.

The communications manager 1610 may also identify a first UE in sidelink communications with one or more second UEs, transmit an indication of an association between one or more sidelink channel state information reports generated by the one or more second UEs and channel state information reports pertaining to channel quality between the first UE and the base station and generated by the first UE, and receive, from the first UE in a same channel, the one or more sidelink channel state information reports generated by the one or more second UEs and the channel state information reports generated by the first UE, where one or more parts of the one or more sidelink channel state information reports generated by the one or more second UEs are prioritized over the channel state information reports generated by the first UE.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting CSI report aggregation and UCI multiplexing for sidelink communications).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
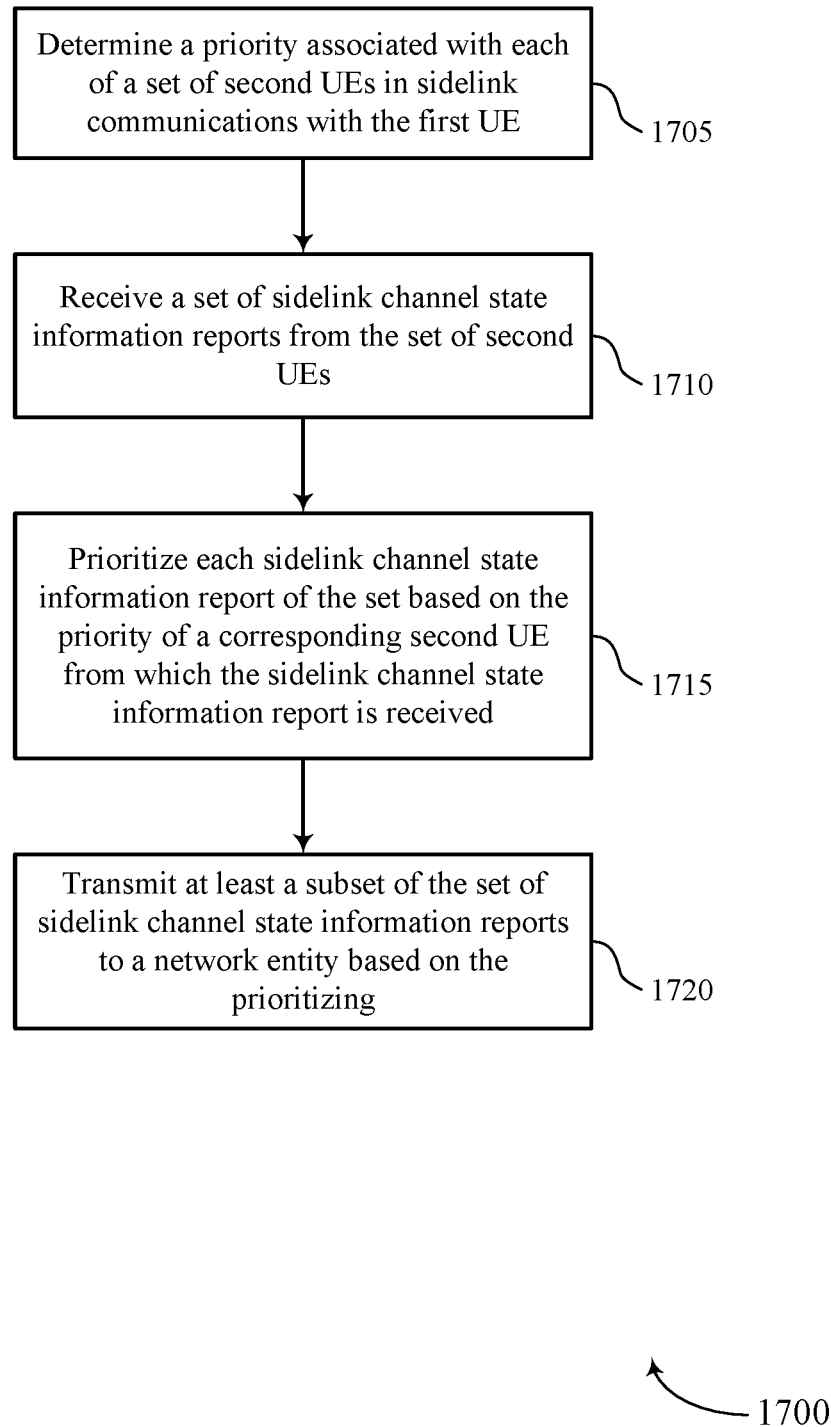
FIGS. 17 through 20 show flowcharts illustrating methods that support CSI report aggregation and UCI multiplexing for sidelink communications in accordance with aspects of the present disclosure.

FIG. 17 shows a flowchart illustrating a method 1700 that supports CSI report aggregation and UCI multiplexing for sidelink communications in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1705, the UE may determine a priority associated with each of a set of second UEs in sidelink communications with the first UE. For instance, the UE may receive an indication of the priority associated with each of the plurality of second UEs. The operations of 1705 may be performed according to the methods described herein. In some examples, aspects of the operations of 1705 may be performed by a UE priority manager as described with reference to FIGS. 9 through 12.

At 1710, the UE may receive a set of sidelink channel state information reports from the set of second UEs to be forwarded to a base station. The operations of 1710 may be performed according to the methods described herein. In some examples, aspects of the operations of 1710 may be performed by a CSI report manager as described with reference to FIGS. 9 through 12.

At 1715, the UE may prioritize each sidelink channel state information report of the set of sidelink channel state information reports based on the priority of a corresponding second UE from which the sidelink channel state information report is received. In some cases, the UE may also determine that a first payload size of the set of sidelink channel state information reports exceeds a maximum size of a transmission container. In such cases, the UE may omit at least a part of one or more of the set of sidelink channel state information reports from the transmission. The operations of 1715 may be performed according to the methods described herein. In some examples, aspects of the operations of 1715 may be performed by a CSI report priority manager as described with reference to FIGS. 9 through 12.

At 1720, the UE may transmit at least a subset of the set of sidelink channel state information reports to the base station based on the prioritizing. In some cases, the UE may transmit the subset of the set of sidelink channel state information reports based on the omitting described at 1715. In such cases, a second payload size of the subset of the set of sidelink channel state information reports may be smaller than or equal to the maximum size of the transmission container. The operations of 1720 may be performed according to the methods described herein. In some examples, aspects of the operations of 1720 may be performed by a CSI report manager as described with reference to FIGS. 9 through 12.

Figure 18:
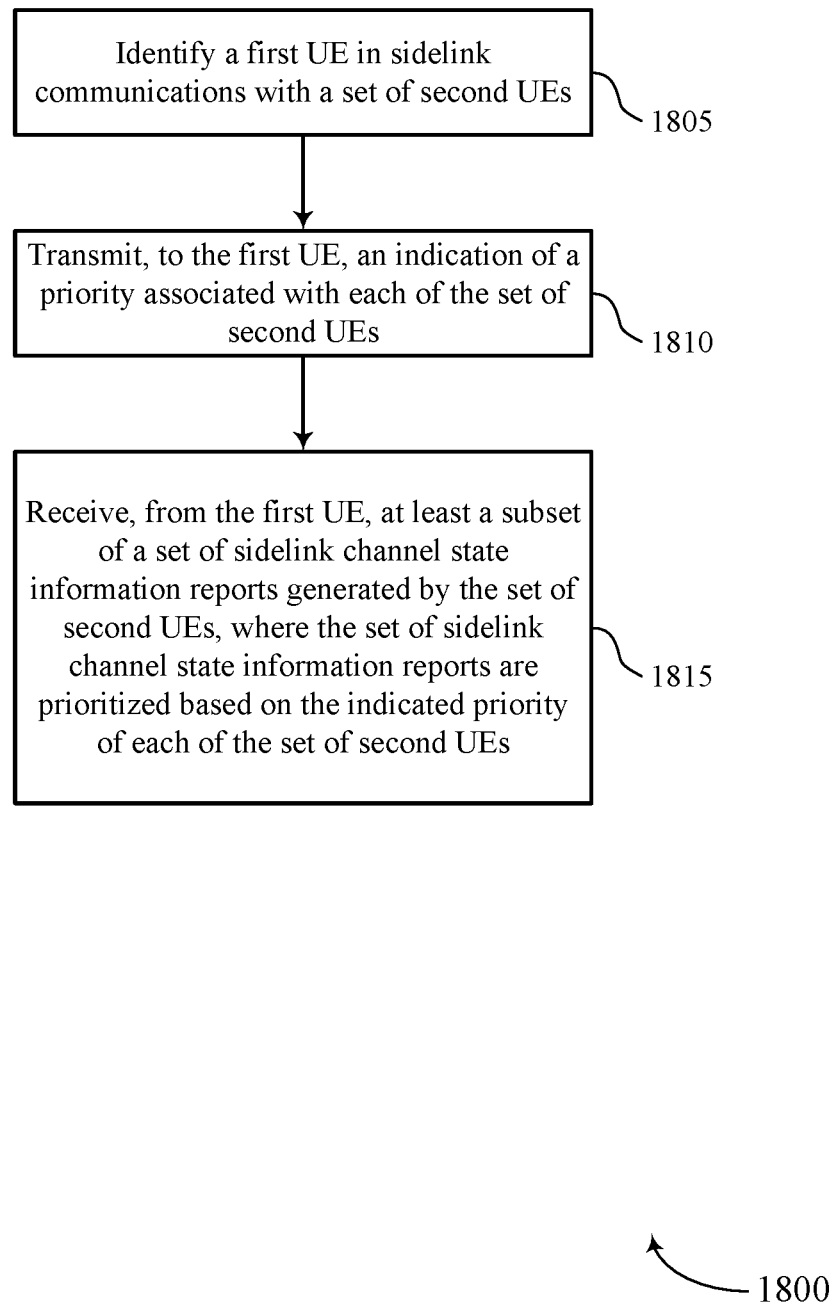

FIG. 18 shows a flowchart illustrating a method 1800 that supports CSI report aggregation and UCI multiplexing for sidelink communications in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 1805, the base station may identify a first UE in sidelink communications with a set of second UEs. The operations of 1805 may be performed according to the methods described herein. In some examples, aspects of the operations of 1805 may be performed by a sidelink manager as described with reference to FIGS. 13 through 16.

At 1810, the base station may transmit, to the first UE, an indication of a priority associated with each of the set of second UEs. The operations of 1810 may be performed according to the methods described herein. In some examples, aspects of the operations of 1810 may be performed by a UE priority manager as described with reference to FIGS. 13 through 16.

At 1815, the base station may receive, from the first UE, at least a subset of a set of sidelink channel state information reports generated by the set of second UEs, where the set of sidelink channel state information reports are prioritized based on the indicated priority of each of the set of second UEs. The operations of 1815 may be performed according to the methods described herein. In some examples, aspects of the operations of 1815 may be performed by a CSI report manager as described with reference to FIGS. 13 through 16.

Figure 19:
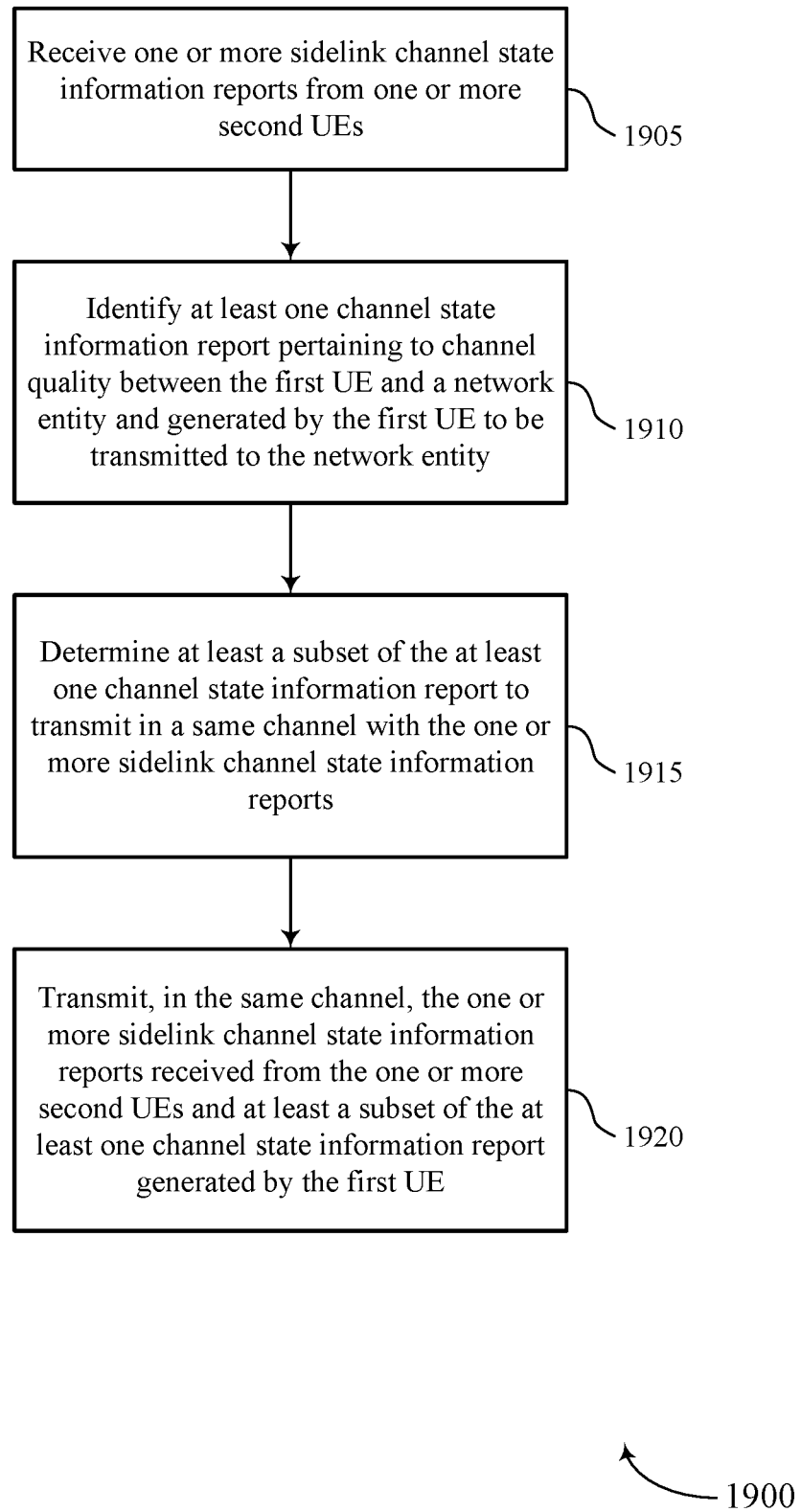

FIG. 19 shows a flowchart illustrating a method 1900 that supports CSI report aggregation and UCI multiplexing for sidelink communications in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1905, the UE may receive one or more sidelink channel state information reports from one or more second UEs. The operations of 1905 may be performed according to the methods described herein. In some examples, aspects of the operations of 1905 may be performed by a CSI report manager as described with reference to FIGS. 9 through 12.

At 1910, the UE may identify at least one channel state information report pertaining to channel quality between the first UE and a network entity and generated by the first UE to be transmitted to the network entity. The operations of 1910 may be performed according to the methods described herein. In some examples, aspects of the operations of 1910 may be performed by a CSI report manager as described with reference to FIGS. 9 through 12.

At 1915, the UE may determine at least a subset of the at least one channel state information report to transmit in a same channel with the one or more sidelink channel state information reports. In some cases, the UE may prioritize one or more parts of the one or more sidelink channel state information reports received from the one or more second UEs over the at least one channel state information report generated by the first UE. In such cases, determining at least the subset of the at least one channel state information report to transmit in the same channel is based at least in part on the prioritizing. The operations of 1915 may be performed according to the methods described herein. In some examples, aspects of the operations of 1915 may be performed by a CSI report priority manager as described with reference to FIGS. 9 through 12.

At 1920, the UE may transmit, in the same channel, the one or more sidelink channel state information reports received from the one or more second UEs and at least a subset of the at least one channel state information report generated by the first UE. The operations of 1920 may be performed according to the methods described herein. In some examples, aspects of the operations of 1920 may be performed by a CSI report manager as described with reference to FIGS. 9 through 12.

Figure 20:
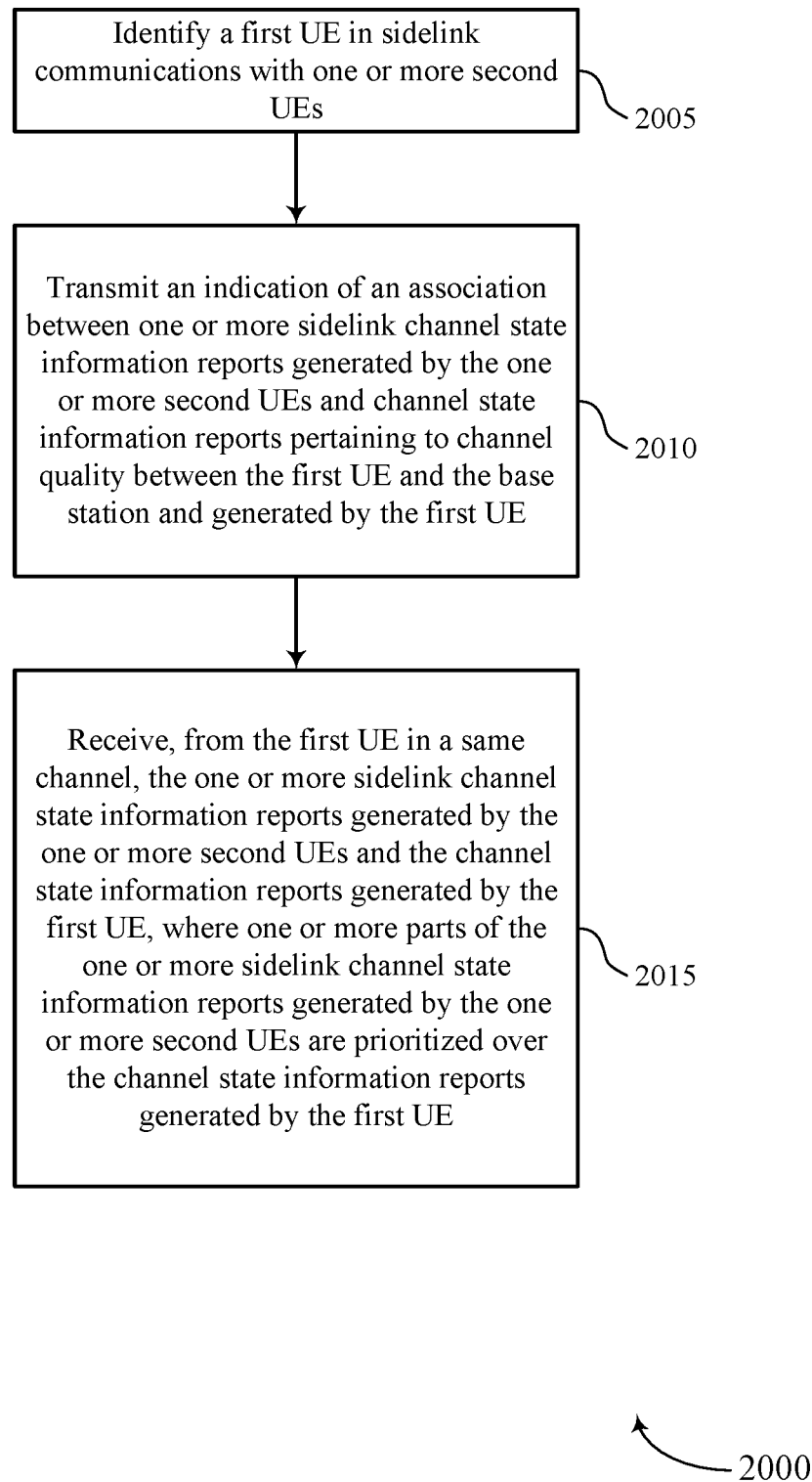

FIG. 20 shows a flowchart illustrating a method 2000 that supports CSI report aggregation and UCI multiplexing for sidelink communications in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 2005, the base station may identify a first UE in sidelink communications with one or more second UEs. The operations of 2005 may be performed according to the methods described herein. In some examples, aspects of the operations of 2005 may be performed by a sidelink manager as described with reference to FIGS. 13 through 16.

At 2010, the base station may transmit an indication of an association between one or more sidelink channel state information reports generated by the one or more second UEs and channel state information reports pertaining to channel quality between the first UE and the base station and generated by the first UE. The operations of 2010 may be performed according to the methods described herein. In some examples, aspects of the operations of 2010 may be performed by a CSI report manager as described with reference to FIGS. 13 through 16.

At 2015, the base station may receive, from the first UE in a same channel, the one or more sidelink channel state information reports generated by the one or more second UEs and the channel state information reports generated by the first UE, where one or more parts of the one or more sidelink channel state information reports generated by the one or more second UEs are prioritized over the channel state information reports generated by the first UE. The operations of 2015 may be performed according to the methods described herein. In some examples, aspects of the operations of 2015 may be performed by a CSI report manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, from a network entity, an indication of a priority associated with each of a plurality of second UEs in sidelink communications with the first UE;
   receiving a plurality of sidelink channel state information reports from the plurality of second UEs;
   prioritizing each sidelink channel state information report of the plurality of sidelink channel state information reports based at least in part on the priority of a corresponding second UE from which the sidelink channel state information report is received; and
   transmitting at least a subset of the plurality of sidelink channel state information reports to the network entity based at least in part on the prioritizing.

2. The method of claim 1, further comprising:
   determining that a first payload size of the plurality of sidelink channel state information reports exceeds a maximum size of a transmission container;
   omitting at least a part of one or more of the plurality of sidelink channel state information reports from the transmission; and
   transmitting the subset of the plurality of sidelink channel state information reports based at least in part on the omitting, wherein a second payload size of the subset of the plurality of sidelink channel state information reports is smaller than or equal to the maximum size of the transmission container.

3. The method of claim 1, further comprising:
   assigning a report configuration identification (ID) to each sidelink channel state information report of the plurality of sidelink channel state information reports based at least in part on the priority of the corresponding second UE from which the channel state information report is received; and
   prioritizing each sidelink channel state information report of the plurality of sidelink channel state information reports based at least in part on the assigned report configuration ID.

4. The method of claim 1, wherein the priority of the corresponding second UE is associated with an identification (ID) of the corresponding second UE from which the sidelink channel state information report is received, a priority associated with an ID of a group of second UEs that includes the corresponding second UE from which the sidelink channel state information report is received, or a priority associated with an ID of sidelink communications between the first UE and the corresponding second UE.

5. The method of claim 1, wherein prioritizing each sidelink channel state information report of the plurality of sidelink channel state information reports comprises:
   prioritizing each sidelink channel state information report of the plurality of sidelink channel state information reports based at least in part on the priority of the corresponding second UE from which the sidelink channel state information report is received and one or more other factors.

6. The method of claim 5, further comprising:
determining a priority value to assign to each sidelink channel state information report of the plurality of sidelink channel state information reports based at least in part on the priority of the corresponding second UE from which the sidelink channel state information report is received and the one or more other factors; and
assigning the priority value to the sidelink channel state information report.

7. The method of claim 6, wherein determining the priority value comprises:
determining the priority value to assign to each sidelink channel state information report of the plurality of sidelink channel state information reports based at least in part on:
a first value representing the priority of the corresponding second UE from which the channel state information report is received, and a first mathematical weight applied to the first value; and
a second value representing each of the one or more other factors and a second mathematical weight applied to the second value.

8. The method of claim 7, wherein each second mathematical weight is greater than the first mathematical weight such that the one or more other factors are more impactful on the priority value assigned to each sidelink channel state information report than the priority of the corresponding second UE from which the sidelink channel state information report is received.

9. The method of claim 7, wherein the first mathematical weight is greater than each second mathematical weight such that the priority of the corresponding second UE from which each sidelink channel state information report is received is more impactful on the priority value assigned to each sidelink channel state information report than the one or more other factors.

10. The method of claim 5, wherein the one or more other factors comprise one or more of a time domain configuration associated with the sidelink channel state information report received from the corresponding second UE, a physical channel on which the sidelink channel state information report is received from the corresponding second UE, a content of the sidelink channel state information report received from the corresponding second UE, a serving cell to which the sidelink channel state information report received from the corresponding second UE pertains, or a bandwidth part to which the sidelink channel state information report received from the corresponding second UE pertains.

11. The method of claim 10, wherein the physical channel on which the sidelink channel state information report is received from the corresponding second UE comprises a physical sidelink shared channel (PSSCH), a physical sidelink control channel (PSCCH), or a physical sidelink feedback channel (PSFCH).

12. The method of claim 1, further comprising:
determining that a first channel allocated for transmitting at least the subset of the plurality of sidelink channel state information reports collides with a second channel allocated for transmitting other channel state information reports; and
determining whether to transmit at least the subset of the plurality of sidelink channel state information reports on the first channel or the other channel state information reports on the second channel.

13. The method of claim 12, further comprising:
determining that the plurality of sidelink channel state information reports are associated with unicast sidelink transmissions; and
transmitting at least the subset of the plurality of sidelink channel state information reports on the first channel.

14. The method of claim 12, further comprising:
determining that the plurality of sidelink channel state information reports are associated with groupcast or broadcast sidelink transmissions; and
transmitting the other channel state information reports on the second channel.

15. The method of claim 12, further comprising:
determining that the other channel state information reports are associated with mobile broadband communications; and
transmitting at least the subset of the plurality of sidelink channel state information reports on the first channel.

16. The method of claim 12, further comprising:
determining that the other channel state information reports are associated with low latency communications; and
transmitting the other channel state information reports on the second channel.

17. A method for wireless communication at a first user equipment (UE), comprising:
receiving one or more sidelink channel state information reports from one or more second UEs;
identifying at least one channel state information report pertaining to channel quality between the first UE and a network entity and generated by the first UE to be transmitted to the network entity;
prioritizing wideband sidelink channel state information reports of the one or more sidelink channel state information reports over wideband channel state information reports or subband channel state information reports of the at least one channel state information report;
determining, based at least in part on the prioritizing, at least a subset of the at least one channel state information report to transmit in a same channel with the one or more sidelink channel state information reports; and
transmitting, in the same channel, the one or more sidelink channel state information reports received from the one or more second UEs and at least a subset of the at least one channel state information report generated by the first UE.

18. The method of claim 17, further comprising:
receiving an indication of an association between the one or more sidelink channel state information reports received from the one or more second UEs and the at least one channel state information report generated by the first UE; and
transmitting, in the same channel, the one or more sidelink channel state information reports received from the one or more second UEs and at least the subset of the at least one channel state information report generated by the first UE based at least in part on receiving the indication.

19. The method of claim 17, wherein the one or more sidelink channel state information reports received from the one or more second UEs and at least the subset of the at least one channel state information report generated by the first UE are transmitted in part two of a physical uplink shared channel transmission.

20. The method of claim 19, wherein the part two of the physical uplink shared channel transmission has a variable size.

21. An apparatus for wireless communication at a first user equipment (UE), comprising:
a processor,
memory coupled with the processor; and
instructions stored in the memory and executable by the processor to cause the apparatus to:
receive, from a network entity, an indication of a priority associated with each of a plurality of second UEs in sidelink communications with the first UE;
receive a plurality of sidelink channel state information reports from the plurality of second UEs;
prioritize each sidelink channel state information report of the plurality of sidelink channel state information reports based at least in part on the priority of a corresponding second UE from which the sidelink channel state information report is received; and
transmit at least a subset of the plurality of sidelink channel state information reports to the network entity based at least in part on the prioritizing.

22. The apparatus of claim 21, wherein the instructions are further executable by the processor to cause the apparatus to:
determine that a first payload size of the plurality of sidelink channel state information reports exceeds a maximum size of a transmission container;
omit at least a part of one or more of the plurality of sidelink channel state information reports from the transmission; and
transmit the subset of the plurality of sidelink channel state information reports based at least in part on the omitting, wherein a second payload size of the subset of the plurality of sidelink channel state information reports is smaller than or equal to the maximum size of the transmission container.

23. The apparatus of claim 21, wherein the instructions are further executable by the processor to cause the apparatus to:
assign a report configuration identification (ID) to each sidelink channel state information report of the plurality of sidelink channel state information reports based at least in part on the priority of the corresponding second UE from which the channel state information report is received; and
prioritize each sidelink channel state information report of the plurality of sidelink channel state information reports based at least in part on the assigned report configuration ID.

24. The apparatus of claim 21, wherein the priority of the corresponding second UE is associated with an identification (ID) of the corresponding second UE from which the sidelink channel state information report is received, a priority associated with an ID of a group of second UEs that includes the corresponding second UE from which the sidelink channel state information report is received, or a priority associated with an ID of sidelink communications between the first UE and the corresponding second UE.

25. The apparatus of claim 21, wherein the instructions to prioritize each sidelink channel state information report of the plurality of sidelink channel state information reports are executable by the processor to cause the apparatus to:
prioritize each sidelink channel state information report of the plurality of sidelink channel state information reports based at least in part on the priority of the corresponding second UE from which the sidelink channel state information report is received and one or more other factors.

26. An apparatus for wireless communication at a first user equipment (UE), comprising:
a processor,
memory coupled with the processor; and
instructions stored in the memory and executable by the processor to cause the apparatus to:
receive one or more sidelink channel state information reports from one or more second UEs;
identify at least one channel state information report pertaining to channel quality between the first UE and a network entity and generated by the first UE to be transmitted to the network entity;
prioritize wideband sidelink channel state information reports of the one or more sidelink channel state information reports over wideband channel state information reports or subband channel state information reports of the at least one channel state information report;
determine, based at least in part on the prioritizing, at least a subset of the at least one channel state information report to transmit in a same channel with the one or more sidelink channel state information reports; and
transmit, in the same channel, the one or more sidelink channel state information reports received from the one or more second UEs and at least a subset of the at least one channel state information report generated by the first UE.

27. The apparatus of claim 26, wherein the instructions are further executable by the processor to cause the apparatus to:
receive an indication of an association between the one or more sidelink channel state information reports received from the one or more second UEs and the at least one channel state information report generated by the first UE; and
transmit, in the same channel, the one or more sidelink channel state information reports received from the one or more second UEs and at least the subset of the at least one channel state information report generated by the first UE based at least in part on receiving the indication.

28. The apparatus of claim 26, wherein the one or more sidelink channel state information reports received from the one or more second UEs and at least the subset of the at least one channel state information report generated by the first UE are transmitted in part two of a physical uplink shared channel transmission.

* * * * *